（12）United States Patent
Morrison et al.

(10) Patent No.: US 9,961,317 B2
(45) Date of Patent: May 1, 2018

(54) MULTI-PROJECTOR ALIGNMENT REFINEMENT

(71) Applicant: CANON KABUSHIKI KAISHA, Tokyo (JP)

(72) Inventors: Paul William Morrison, Erskine Park (AU); Ben Yip, Ryde (AU); Cameron Murray Edwards, Clovelly (AU); Eric Wai Shing Chong, Carlingford (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/386,805

(22) Filed: Dec. 21, 2016

(65) Prior Publication Data
US 2017/0180689 A1    Jun. 22, 2017

(30) Foreign Application Priority Data
Dec. 22, 2015  (AU) ................. 2015275255

(51) Int. Cl.
*H04N 9/31*  (2006.01)

(52) U.S. Cl.
CPC ......... *H04N 9/3185* (2013.01); *H04N 9/3147* (2013.01); *H04N 9/3194* (2013.01)

(58) Field of Classification Search
CPC ...... G03B 21/13; G03B 21/14; G03B 21/147; H04N 9/64; H04N 9/3147; H04N 9/3182; H04N 9/3185; H04N 9/3194
See application file for complete search history.

(56) References Cited

U.S. PATENT DOCUMENTS

| 5,077,154 | A  | * | 12/1991 | Corley | ................. | G03B 21/13 |
|---|---|---|---|---|---|---|
|  |  |  |  |  |  | 353/29 |
| 6,760,075 | B2 | * | 7/2004 | Mayer, III | ............... | H04N 9/12 |
|  |  |  |  |  |  | 345/1.3 |
| 2003/0227599 | A1 | * | 12/2003 | Weissman | ................ | H04N 5/74 |
|  |  |  |  |  |  | 353/94 |
| 2006/0139579 | A1 | * | 6/2006 | Kasahara | ............... | G03B 21/14 |
|  |  |  |  |  |  | 353/94 |
| 2008/0007700 | A1 |   | 1/2008 | Vanbaar et al. |  |  |
| 2010/0103379 | A1 |   | 4/2010 | Fiess |  |  |
| 2011/0007172 | A1 | * | 1/2011 | Miceli | .................. | H04N 9/3147 |
|  |  |  |  |  |  | 348/222.1 |
| 2012/0120372 | A1 |   | 5/2012 | Timoner et al. |  |  |

\* cited by examiner

*Primary Examiner* — Sultan Chowdhury
(74) *Attorney, Agent, or Firm* — Canon U.S.A., Inc. IP Division

(57) ABSTRACT

A method of aligning two portions of an image, the portions being projected by projectors on a surface to form respective projected portions of the image, a calibration pattern being embedded in each of the two portions, the method comprising capturing from the surface an image of the pattern from the projected portions, the calibration pattern extending across a combined projection area of the projectors; locating an overlap area according to locations of calibration points; determining projector image coordinates dependent upon locations in the overlap area; and aligning the two portions of the image according to the locations of control points and the locations in the overlap area.

20 Claims, 22 Drawing Sheets

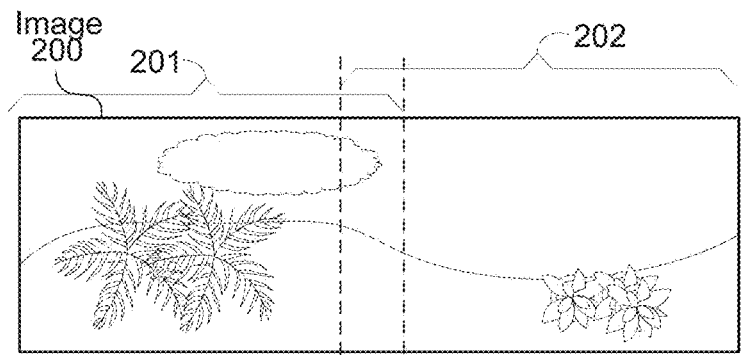
Fig. 2A
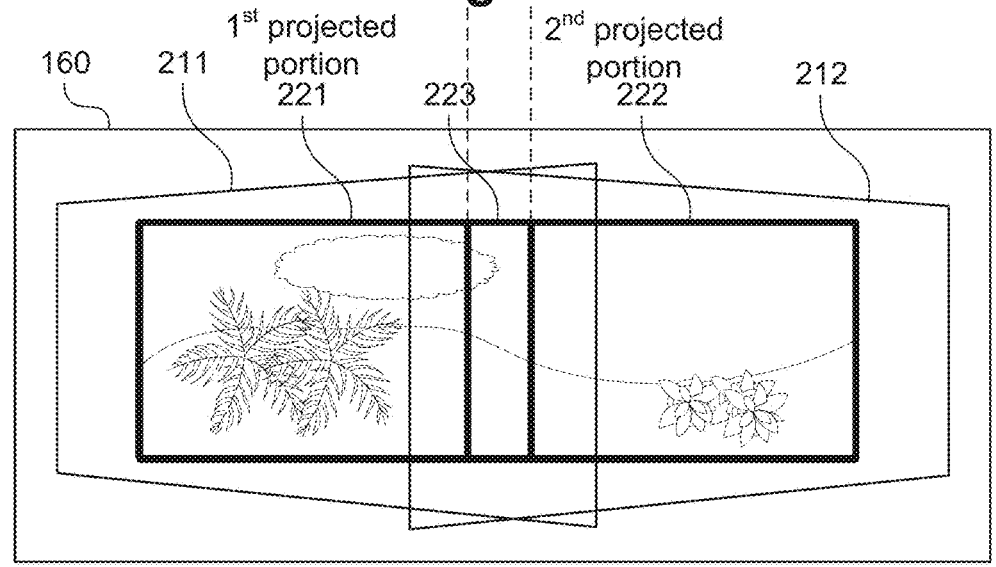
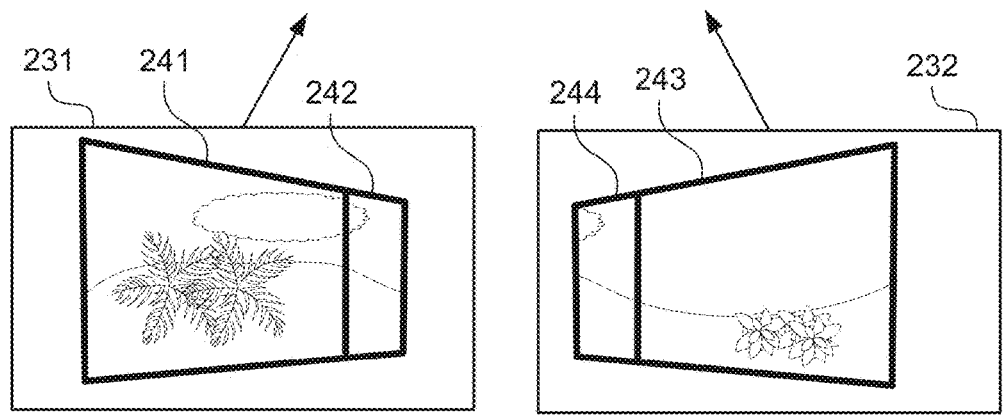
Fig. 2B

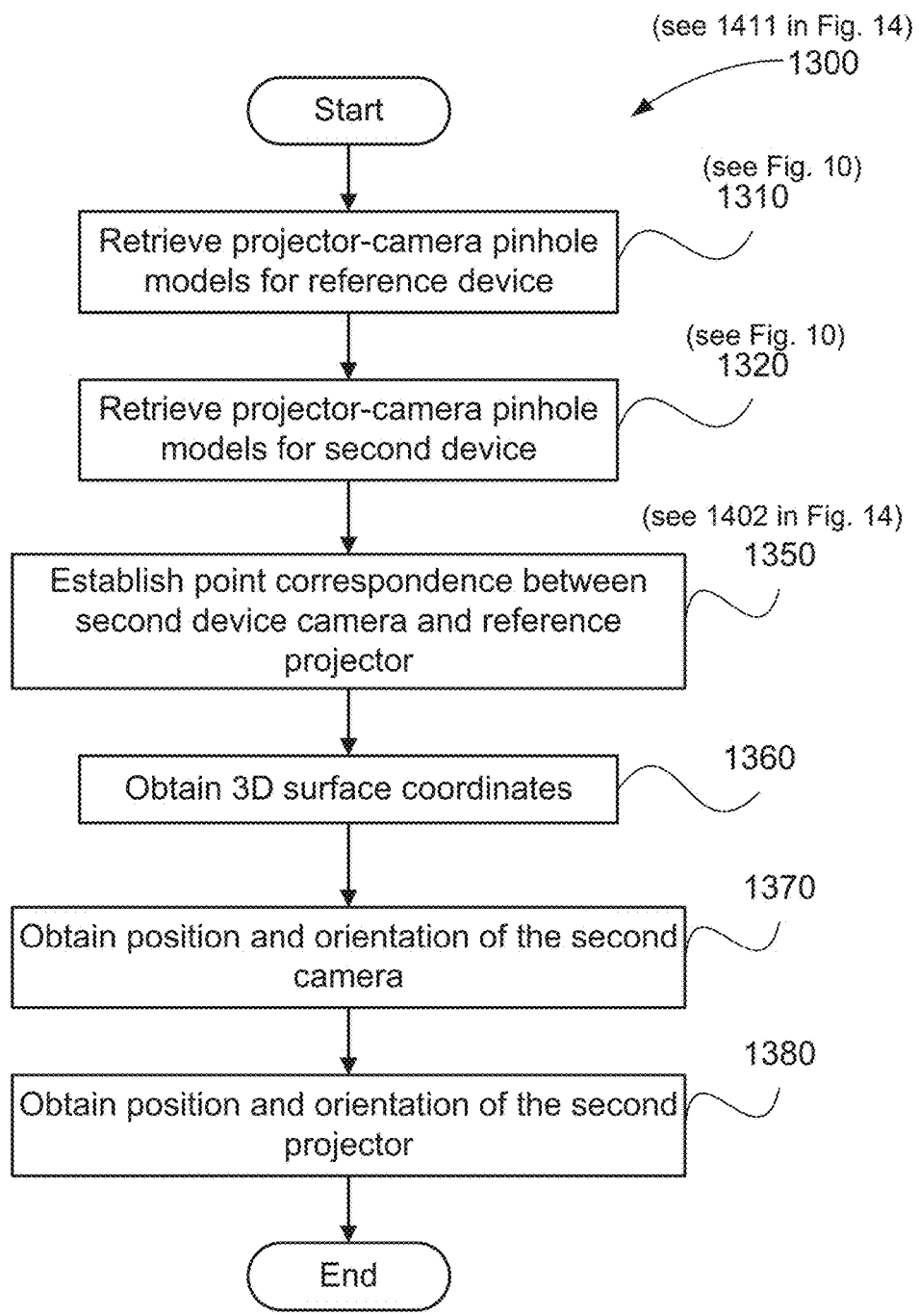

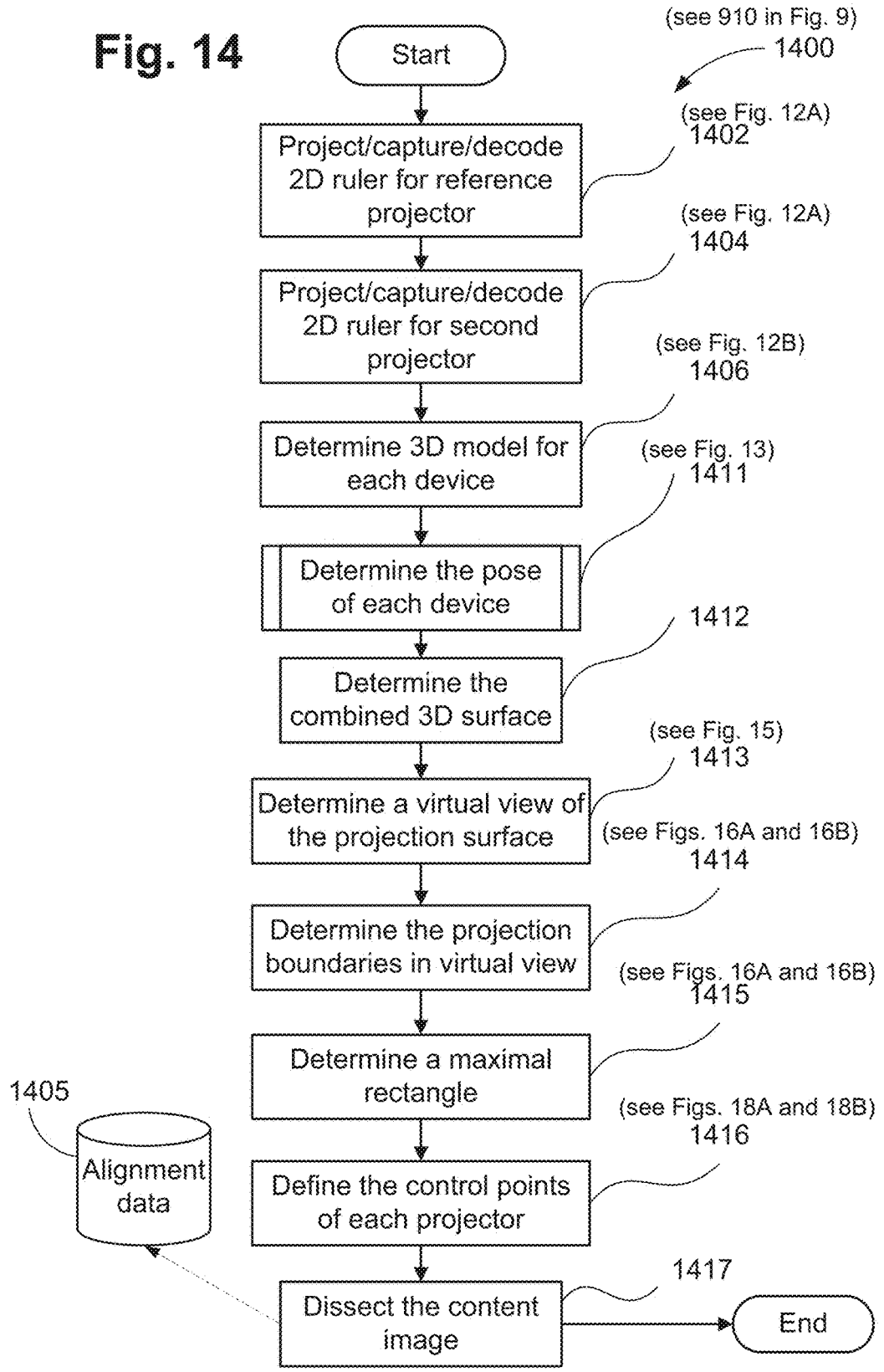

MULTI-PROJECTOR ALIGNMENT REFINEMENT

CROSS-REFERENCE TO RELATED PATENT APPLICATION(S)

This application claims the benefit under 35 U.S.C. § 119 of the filing date of Australian Patent Application No. 2015275255, filed 22 Dec. 2015, hereby incorporated by reference in its entirety as if fully set forth herein.

TECHNICAL FIELD

The present invention relates generally to the field of multi-projector system alignment and, in particular, to a method, apparatus and system for refining the alignment of two portions of an image projected by a multi-projector system. The present invention also relates to a computer program product including a computer readable medium having recorded thereon a computer program to refine the alignment of two portions of an image projected by a multi-projector system.

BACKGROUND

Projectors are widely-used display devices that can be used to produce an image on many surface types. Multiple projectors are commonly used to increase the size of a projection onto a projection surface whilst retaining high resolution and brightness. For example, four projectors can be arranged in a grid configuration to produce a single image that is four times larger than the image produced by a single projector.

A problem of such multi-projector systems is the need for geometric alignment of the projected images on the projection surface. It is important that a viewer perceives a single image that has no visible seams or brightness fluctuations. Precise alignment of the projected images is therefore very important. Many current multi-projection systems require a significant amount of manual effort to perform alignment.

One prior art technique requires the user to establish point correspondences manually. Given two overlapping projections, the user first manually chooses a point in the projection overlap region within the first projector image, and then manually searches and selects a corresponding point within the second projector image.

Some prior art systems perform an automatic alignment procedure at system installation time, for example using projected calibration patterns or structured light patterns, commonly known in the art.

To achieve high accuracy in alignment, an alignment refinement process is needed. Given an initial, approximate coarse alignment, an alignment refinement process can be used to adjust the initial alignment to achieve a more accurate fine alignment.

One prior art technique projects a regular grid like calibration pattern, uses simulated annealing to iteratively estimate alignment parameters and projects a corresponding updated calibration pattern. The alignment parameters are obtained when the algorithm converges. Some drawbacks of this prior art technique are that the calibration pattern is highly visible to human viewers and that the calibration process is slow to update since the technique requires many frames of calibration pattern to be projected, captured and processed.

Multi-projector systems may fall out of alignment over time, for example, due to physical movement of a projector or surface, building vibration, or heat fluctuations causing small movement of a projector's internal components. When such systems become misaligned, a manual or automatic alignment procedure typically needs to be performed.

Other prior art techniques are capable of continuous automatic alignment of multiple projectors. While visible content is being displayed (e.g. a video or image), calibration patterns are also displayed, and are photographed by one or more cameras. The calibration patterns may be in the infrared spectrum. Alternatively, the calibration patterns may be embedded in the projected content images, preferably in such a way that the viewer is unable to perceive the calibration patterns.

SUMMARY

It is an object of the present invention to substantially overcome, or at least ameliorate, one or more issues of existing arrangements.

Disclosed are arrangements, referred to as Alignment Refinement Projection System (ARPS) arrangements, which seek to address the above problems by decoding overlapping 2D ruler images at further locations in an overlap region to produce corresponding projector positions, determining content positions corresponding to the projector positions, and for each set of corresponding content positions, determining a desired content position to display at these projector positions.

According to a first aspect of the present invention, there is provided a method for aligning two portions of an image, a first of the portions being projected by a first projector on a surface and a second of the portions being projected by a second projector on the surface to form respective projected portions of the image, wherein a calibration pattern is embedded in each of the two portions, the method comprising the steps of: capturing from the image surface an image of the calibration pattern from each of first and second projected portions, the calibration pattern extending across a combined projection area of the first and second projectors; locating an overlap area of the first and second projected portions of the image according to locations of a plurality of the calibration points across the combined projection area; determining, using the calibration patterns projected on the surface, projector image coordinates dependent upon locations in the overlap area said locations being within in each of the first and second projected portions; and aligning the two portions of the image according to the locations of control points and the determined locations in the overlap area of the first and second projected portions.

According to another aspect of the present invention, there is provided an apparatus for implementing any one of the aforementioned methods.

According to another aspect of the present invention there is provided a computer program product including a computer readable medium having recorded thereon a computer program for implementing any one of the methods described above.

Other aspects are also disclosed.

BRIEF DESCRIPTION OF THE DRAWINGS

One or more embodiments of the invention will now be described with reference to the following drawings, in which:

FIGS. 2A and 2B show an example of the alignment and blending of two projections, for example using the multi-projector system of FIG. 1;

FIG. 13 is a schematic flow diagram illustrating the process of obtaining the position and orientation of a second device;

FIG. 14 is a schematic flow diagram illustrating the process of coarse alignment;

DETAILED DESCRIPTION INCLUDING BEST MODE

Figure 1:
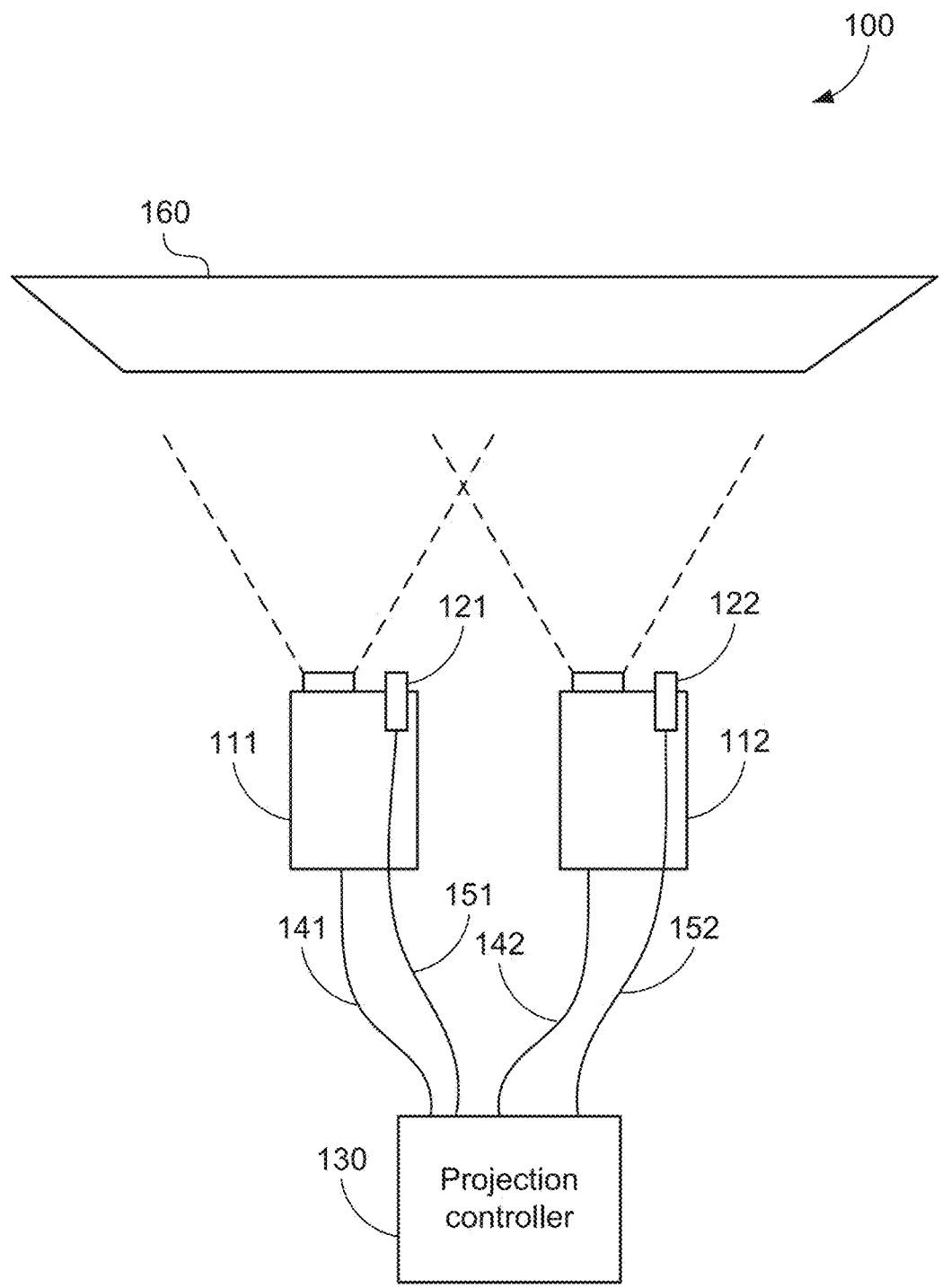
FIG. 1 shows an example of a multi-projector system according to an ARPS arrangement.

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which may form public knowledge through their respective publication and/or use. Such discussions should not be interpreted as a representation by the present inventor(s) or the patent applicant that such documents or devices in any way form part of the common general knowledge in the art.

The inventors have realized that an ideal calibration pattern used in continuous automatic alignment is one that is not perceived by human viewers, and requires a minimal number of projected frames. The disclosed ARPS arrangements seek to provide a continuous automatic alignment method that can perform accurate alignment refinement with no additional projected frames.

Context

FIG. 1: System Diagram

FIG. 1 shows an example of a multi-projector system 100. The multi-projector system 100 includes a left-hand projector 111, a left-hand camera 121, a right-hand projector 112, and a right-hand camera 122. The left-hand projector 11 1and the left-hand camera 121 may be considered as one device. The right-hand projector 112 and the right-hand camera 122 may be considered as one device. A projection controller 130 sends images to each projector 111 and 112 via display cables 141 and 142, respectively. The projection controller 130 receives images from each camera 121 and 122 via cables 151 and 152, respectively. Each projector 111 and 112 projects images sent by the projection controller 130 onto a projection surface 160. In the example, the projection surface 160 is planar (i.e. flat).

The left-hand camera 121 preferably captures an image containing the entire projection of the left-hand projector 111 on the projection surface 160, and a portion of the projection of the right-hand projector 112 on the projection surface 160. Similarly, the right-hand camera 122 preferably captures an image containing the entire projection of the right-hand projector 112 on the projection surface 160, and a portion of the projection of the left-hand projector 111 on the projection surface 160. The projection controller 130 therefore receives images from the cameras 121 and 122 of the images that are projected with projectors 111 and 112.

Each camera 121, 122 is preferably mounted on a projector at a fixed position and orientation. For example, the left-hand camera 121 is preferably fixed to the left-hand projector 111, and the right-hand camera 122 is preferably fixed to the right-hand projector 112. Alternatively, a camera may be integrated within a projector to form a single device that can project and capture images. In the context of the ARPS arrangement, each camera can be located at any position relative to its corresponding projector, as long as each camera is somewhat separated from its corresponding projector and as long as each camera has a view of the projection of its corresponding projector and neighbouring projections. Separation of each camera from its corresponding projector allows 3D positions to be determined from pairs of corresponding points in camera and projector images, a process known in the art as triangulation of point correspondences. For example, a separation of 200 millimeters between projector and camera is sufficient to allow triangulation of point correspondences.

It is an object of the multi-projector system 100 to display a single aligned content image on the projection surface 160. Each projector 111 and 112 projects a portion of the single aligned content image, also referred to as a portion of a content image, or a portion of an image. A calibration pattern is embedded within each portion of the content image projected by the projectors 111 and 112. The projection controller 130 uses images of the calibration pattern, extending across a combined projection area of the projectors, captured by the cameras 121 and 122 to align the portions of the content image. The content image displayed on the projection surface 160 appears to a viewer to be a single, upright image, with substantially no seam between the two projected images.

Other configurations of the ARPS arrangement include more than two projectors, and/or one or more cameras. In a preferred ARPS arrangement, described hereinafter in more detail with reference to FIGS. 20A and 20B, the projection controller 130 is implemented using a computer executable software program 2033 executed on a general purpose computer (PC) 2001. In alternative ARPS arrangements, the projection controller 130 is embedded within a projector, or is executed by a projection controller device. Further, the projection surface 160 may be flat, curved, or some other irregular shape, for example.

Figure 20A:
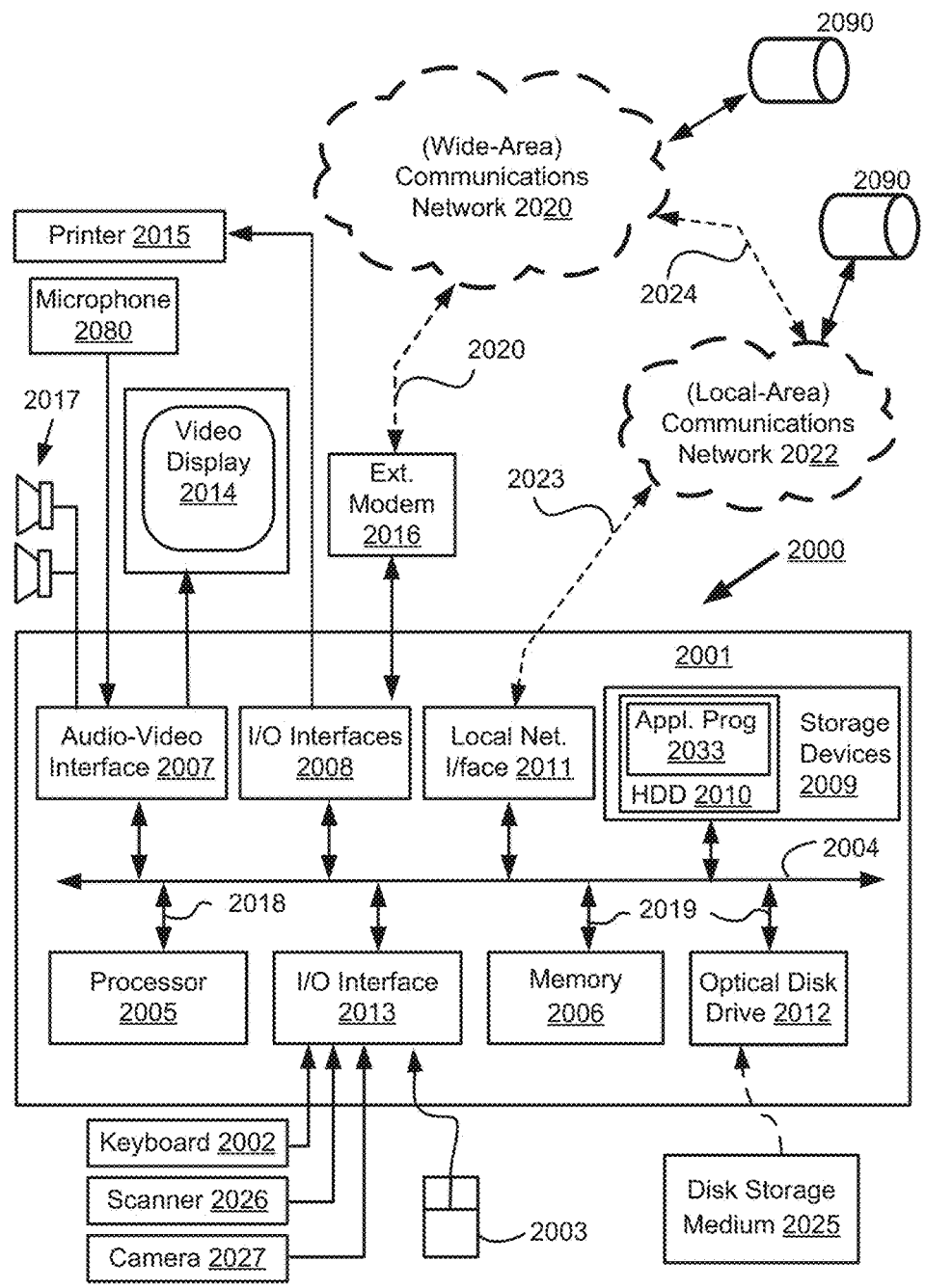
FIGS. 20A and 20B form a schematic block diagram of a general purpose computer system upon which arrangements described can be practiced.
Figure 20B:
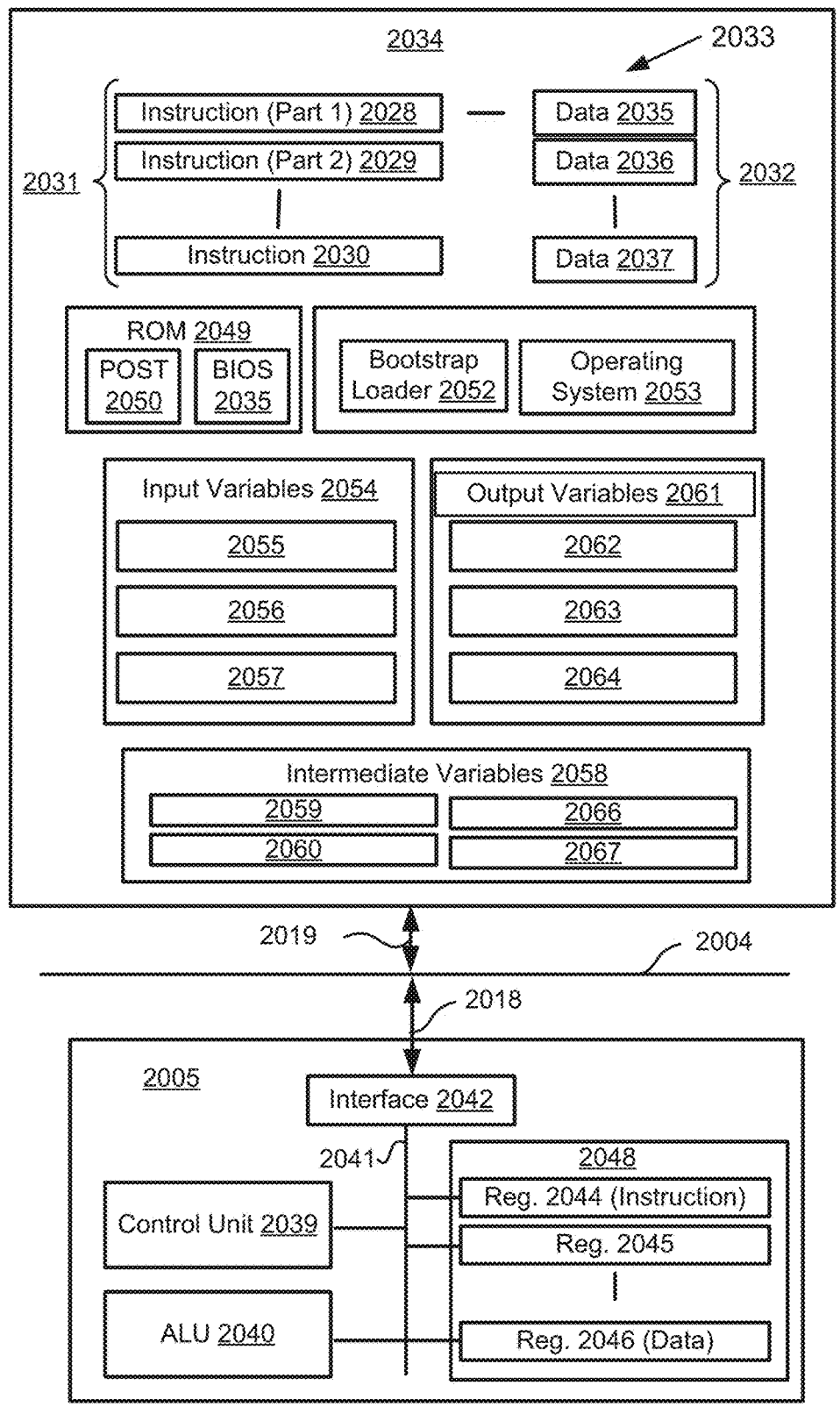

FIGS. 20A and 20B depict a general-purpose computer system 2000, upon which the various arrangements described can be practised.

As seen in FIG. 20A, the computer system 2000 includes: a computer module 2001; input devices such as a keyboard 2002, a mouse pointer device 2003, a scanner 2026, a camera 2027, and a microphone 2080; and output devices including a printer 2015, a display device 2014 and loudspeakers 2017. An external Modulator-Demodulator (Modem) transceiver device 2016 may be used by the computer module 2001 for communicating to and from a communications network 2020 via a connection 2021. The communications network 2020 may be a wide-area network (WAN), such as the Internet, a cellular telecommunications network, or a private WAN. Where the connection 2021 is a telephone line, the modem 2016 may be a traditional "dial-up" modem. Alternatively, where the connection 2021 is a high capacity (e.g., cable) connection, the modem 2016 may be a broadband modem. A wireless modem may also be used for wireless connection to the communications network 2020.

The computer module 2001 typically includes at least one processor unit 2005, and a memory unit 2006. For example, the memory unit 2006 may have semiconductor random access memory (RAM) and semiconductor read only memory (ROM). The computer module 2001 also includes an number of input/output (I/O) interfaces including: an audio-video interface 2007 that couples to the video display 2014, loudspeakers 2017 and microphone 2080; an I/O interface 2013 that couples to the keyboard 2002, mouse 2003, scanner 2026, camera 2027 and optionally a joystick or other human interface device (not illustrated); and an interface 2008 for the external modem 2016 and printer 2015. In some implementations, the modem 2016 may be incorporated within the computer module 2001, for example within the interface 2008. The computer module 2001 also has a local network interface 2011, which permits coupling of the computer system 2000 via a connection 2023 to a local-area communications network 2022, known as a Local Area Network (LAN). As illustrated in FIG. 20A, the local communications network 2022 may also couple to the wide network 2020 via a connection 2024, which would typically include a so-called "firewall" device or device of similar functionality. The local network interface 2011 may comprise an Ethernet circuit card, a Bluetooth® wireless arrangement or an IEEE 802.11 wireless arrangement; however, numerous other types of interfaces may be practiced for the interface 2011.

The I/O interfaces 2008 and 2013 may afford either or both of serial and parallel connectivity, the former typically being implemented according to the Universal Serial Bus (USB) standards and having corresponding USB connectors (not illustrated). Storage devices 2009 are provided and typically include a hard disk drive (HDD) 2010. Other storage devices such as a floppy disk drive and a magnetic tape drive (not illustrated) may also be used. An optical disk drive 2012 is typically provided to act as a non-volatile source of data. Portable memory devices, such optical disks (e.g., CD-ROM, DVD, Bluray® Disc), USB-RAM, portable, external hard drives, and floppy disks, for example, may be used as appropriate sources of data to the system 2000.

The components 2005 to 2013 of the computer module 2001 typically communicate via an interconnected bus 2004 and in a manner that results in a conventional mode of operation of the computer system 2000 known to those in the relevant art. For example, the processor 2005 is coupled to the system bus 2004 using a connection 2018. Likewise, the memory 2006 and optical disk drive 2012 are coupled to the system bus 2004 by connections 2019. Examples of computers on which the described arrangements can be practised include IBM-PC's and compatibles, Sun Sparcstations, Apple Mac™ or like computer systems.

The ARPS method may be implemented using the computer system 2000 wherein the processes of FIGS. 7, 8, 9, 10, 12A, 12B, 13, 14, 17, and 21, to be described, may be implemented as one or more ARPS software application programs 2033 executable within the computer system 2000. In particular, the steps of the ARPS method are effected by instructions 2031 (see FIG. 20B) in the software 2033 that are carried out within the computer system 2000. The software instructions 2031 may be formed as one or more code modules, each for performing one or more particular tasks. The software may also be divided into two separate parts, in which a first part and the corresponding code modules performs the ARPS methods and a second part and the corresponding code modules manage a user interface between the first part and the user.

The ARPS software may be stored in a computer readable medium, including the storage devices described below, for example. The software is loaded into the computer system 2000 from the computer readable medium, and then executed by the computer system 2000. A computer readable medium having such software or computer program recorded on the computer readable medium is referred to as a computer program product. The use of the computer program product in the computer system 2000 preferably effects an advantageous ARPS apparatus.

The ARPS software 2033 is typically stored in the HDD 2010 or the memory 2006. The software is loaded into the computer system 2000 from a computer readable medium, and executed by the computer system 2000. Thus, for example, the software 2033 may be stored on an optically readable disk storage medium (e.g., CD-ROM) 2025 that is read by the optical disk drive 2012. A computer readable medium having such software or computer program recorded on it is a computer program product. The use of the computer program product in the computer system 2000 preferably effects an ARPS apparatus.

In some instances, the application programs 2033 may be supplied to the user encoded on one or more CD-ROMs 2025 and read via the corresponding drive 2012, or alternatively may be read by the user from the networks 2020 or 2022. Still further, the software can also be loaded into the computer system 2000 from other computer readable media. Computer readable storage media refers to any non-transitory tangible storage medium that provides recorded instructions and/or data to the computer system 2000 for execution and/or processing. Examples of such storage media include floppy disks, magnetic tape, CD-ROM, DVD, Bluray™ Disc, a hard disk drive, a ROM or integrated circuit, USB memory, a magneto-optical disk, or a computer readable card such as a PCMCIA card and the like, whether or not such devices are internal or external of the computer module 2001. Examples of transitory or non-tangible computer readable transmission media that may also participate in the provision of software, application programs, instructions and/or data to the computer module 2001 include radio or infra-red transmission channels as well as a network connection to another computer or networked device, and the Internet or Intranets including e-mail transmissions and information recorded on Websites and the like.

The second part of the application programs 2033 and the corresponding code modules mentioned above may be executed to implement one or more graphical user interfaces (GUIs) to be rendered or otherwise represented upon the display 2014. Through manipulation of typically the keyboard 2002 and the mouse 2003, a user of the computer system 2000 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 2017 and user voice commands input via the microphone 2080.

FIG. 20B is a detailed schematic block diagram of the processor 2005 and a "memory" 2034. The memory 2034 represents a logical aggregation of all the memory modules (including the HDD 2009 and semiconductor memory 2006) that can be accessed by the computer module 2001 in FIG. 20A.

When the computer module 2001 is initially powered up, a power-on self-test (POST) program 2050 executes. The POST program 2050 is typically stored in a ROM 2049 of the semiconductor memory 2006 of FIG. 20A. A hardware device such as the ROM 2049 storing software is sometimes referred to as firmware. The POST program 2050 examines hardware within the computer module 2001 to ensure proper functioning and typically checks the processor 2005, the memory 2034 (2009, 2006), and a basic input-output systems software (BIOS) module 2051, also typically stored in the ROM 2049, for correct operation. Once the POST program 2050 has run successfully, the BIOS 2051 activates the hard disk drive 2010 of FIG. 20A. Activation of the hard disk drive 2010 causes a bootstrap loader program 2052 that is resident on the hard disk drive 2010 to execute via the processor 2005. This loads an operating system 2053 into the RAM memory 2006, upon which the operating system 2053 commences operation. The operating system 2053 is a system level application, executable by the processor 2005, to fulfil various high level functions, including processor management, memory management, device management, storage management, software application interface, and generic user interface.

The operating system 2053 manages the memory 2034 (2009, 2006) to ensure that each process or application running on the computer module 2001 has sufficient memory in which to execute without colliding with memory allocated to another process. Furthermore, the different types of memory available in the system 2000 of FIG. 20A must be used properly so that each process can run effectively. Accordingly, the aggregated memory 2034 is not intended to illustrate how particular segments of memory are allocated (unless otherwise stated), but rather to provide a general view of the memory accessible by the computer system 2000 and how such is used.

As shown in FIG. 20B, the processor 2005 includes a number of functional modules including a control unit 2039, an arithmetic logic unit (ALU) 2040, and a local or internal memory 2048, sometimes called a cache memory. The cache memory 2048 typically includes a number of storage registers 2044-2046 in a register section. One or more internal busses 2041 functionally interconnect these functional modules. The processor 2005 typically also has one or more interfaces 2042 for communicating with external devices via the system bus 2004, using a connection 2018. The memory 2034 is coupled to the bus 2004 using a connection 2019.

The ARPS application program 2033 includes a sequence of instructions 2031 that may include conditional branch and loop instructions. The program 2033 may also include data 2032 which is used in execution of the program 2033. The instructions 2031 and the data 2032 are stored in memory locations 2028, 2029, 2030 and 2035, 2036, 2037, respectively. Depending upon the relative size of the instructions 2031 and the memory locations 2028-2030, a particular instruction may be stored in a single memory location as depicted by the instruction shown in the memory location 2030. Alternately, an instruction may be segmented into a number of parts each of which is stored in a separate memory location, as depicted by the instruction segments shown in the memory locations 2028 and 2029.

In general, the processor 2005 is given a set of instructions which are executed therein. The processor 2005 waits for a subsequent input, to which the processor 2005 reacts to by executing another set of instructions. Each input may be provided from one or more of a number of sources, including data generated by one or more of the input devices 2002, 2003, data received from an external source across one of the networks 2020, 2002, data retrieved from one of the storage devices 2006, 2009 or data retrieved from a storage medium 2025 inserted into the corresponding reader 2012, all depicted in FIG. 20A. The execution of a set of the instructions may in some cases result in output of data. Execution may also involve storing data or variables to the memory 2034.

The disclosed ARPS arrangements use input variables 2054, which are stored in the memory 2034 in corresponding memory locations 2055, 2056, 2057. The ARPS arrangements produce output variables 2061, which are stored in the memory 2034 in corresponding memory locations 2062, 2063, 2064. Intermediate variables 2058 may be stored in memory locations 2059, 2060, 2066 and 2067.

Referring to the processor 2005 of FIG. 20B, the registers 2044, 2045, 2046, the arithmetic logic unit (ALU) 2040, and the control unit 2039 work together to perform sequences of micro-operations needed to perform "fetch, decode, and execute" cycles for every instruction in the instruction set making up the program 2033. Each fetch, decode, and execute cycle comprises:

- a fetch operation, which fetches or reads an instruction 2031 from a memory location 2028, 2029, 2030;
- a decode operation in which the control unit 2039 determines which instruction has been fetched; and
- an execute operation in which the control unit 2039 and/or the ALU 2040 execute the instruction.

Thereafter, a further fetch, decode, and execute cycle for the next instruction may be executed. Similarly, a store cycle may be performed by which the control unit 2039 stores or writes a value to a memory location 2032.

Each step or sub-process in the processes of FIGS. 7, 8, 9, 10, 12A, 12B, 13, 14, 17, and 21 is associated with one or more segments of the program 2033 and is performed by the register section 2044, 2045, 2047, the ALU 2040, and the control unit 2039 in the processor 2005 working together to perform the fetch, decode, and execute cycles for every instruction in the instruction set for the noted segments of the program 2033.

The ARPS method may alternatively, as described hereinafter in more detail with reference to FIG. 6, be implemented in dedicated hardware such as one or more integrated circuits performing the ARPS functions or sub functions. Such dedicated hardware may include graphic processors, digital signal processors, or one or more microprocessors and associated memories.

Pinhole Model

A pinhole model is a simple and commonly used model of an imaging device, including a projector such as 111 or a camera such as 121. For a projector, the pinhole model defines the relationship between projector pixel coordinates (u, v) (i.e. 2D coordinates measured in the projector image plane in the units of projector pixels and corresponding points (X, Y, Z) in a 3D physical space. According to the pinhole model, a point (X, Y, Z) and its corresponding projector image pixel coordinates (u, v) are related by a linear equation as stated in Equation 1.

$$s \begin{bmatrix} u \\ v \\ 1 \end{bmatrix} = A_p R_p \begin{bmatrix} X \\ Y \\ Z \end{bmatrix} + T_p \quad \text{Equation 1}$$

Equation 1 is used to transform a 3D physical world coordinate system point (X, Y, Z) to a corresponding 2D projector image point (u, v), where:

s is a normalization scalar that is chosen to ensure the third element in $$\begin{bmatrix} u \\ v \\ 1 \end{bmatrix}$$

equals 1; and $$A_p = \begin{bmatrix} f_x & 0 & \pi_x \\ 0 & f_y & \pi_y \\ 0 & 0 & 1 \end{bmatrix}$$

is a 3×3 matrix called the intrinsic matrix of the projector. The intrinsic matrix $A_p$ of the projector describes a principal point ($\pi_x$, $\pi_y$) and a scaling ($f_x$, $f_y$) of projector image pixels. The principal point is a point where the projector lens optical axis meets the projector image plane, expressed in projector image pixels. The scaling of projector image pixels is dependent on the focal length of the projector lens and the size of projector image pixels.

$R_p$ is a 3×3 rotation matrix describing the orientation of the projector device within a 3D physical world coordinate system.

$T_p$ is a 3×1 translation vector describing the position of the projector device within a 3D physical world coordinate system.

Together $R_p$ and $T_p$ represent the orientation and position (also referred to as the "pose") of the projector relative to a 3D physical space world coordinate system. The present specification uses a first projector's 3D coordinate system as the world coordinate system. Hence, for the first projector, the value of $R_p$ is an identity matrix, and the value of $T_p$ is a zero vector. The values of $R_p$ and $T_p$ of the second projector depend on its pose (i.e. position and orientation) relative to the first projector.

In summary, a pinhole model is used to describe an imaging device and includes an intrinsic matrix A, rotation matrix R and translation vector T. The rotation matrix R and translation vector T are referred to as the extrinsic parameters of the imaging device.

For a camera, the pinhole model defines the relationship between a point in 3D physical space (X, Y, Z) and its corresponding camera image pixel coordinates (u, v) (i.e. 2D coordinates measured in the image plane of the camera in the units of camera pixels as captured by the camera. According to the pinhole model, a point in three dimensional space (X, Y, Z) and its corresponding camera image pixel coordinates (u, v) are related by a linear equation as stated in Equation 2.

$$s \begin{bmatrix} u \\ v \\ 1 \end{bmatrix} = A_c R_c \begin{bmatrix} X \\ Y \\ Z \end{bmatrix} + T_c \quad \text{Equation 2}$$

Equation 2 is used to transform a 3D physical world coordinate system point (X, Y, Z) to a corresponding 2D camera image point (u, v), where:

s is a normalization scalar that is chosen to ensure the third element in $$\begin{bmatrix} u \\ v \\ 1 \end{bmatrix}$$

equals 1; and $$A_c = \begin{bmatrix} f_x & 0 & \pi_x \\ 0 & f_y & \pi_y \\ 0 & 0 & 1 \end{bmatrix}$$

is a 3×3 matrix called the intrinsic matrix of the camera. The intrinsic matrix $A_c$ of the camera describes a principal point ($\pi_x$, $\pi_y$) and a scaling ($f_x$, $f_y$) of camera image pixels. The principal point is a point where the camera lens optical axis meets the camera image plane, expressed in camera image pixels. The scaling of camera image pixels is dependent on the focal length of the camera lens and the size of camera image pixels.

$R_c$ is a 3×3 rotation matrix describing the orientation of the camera device within a 3D physical world coordinate system.

$T_c$ is a 3×1 translation vector describing the position of the camera device within a 3D physical world coordinate system.

The values of $R_c$ and $T_c$ of the camera depend on its relative pose to the first projector.

Figure 10:
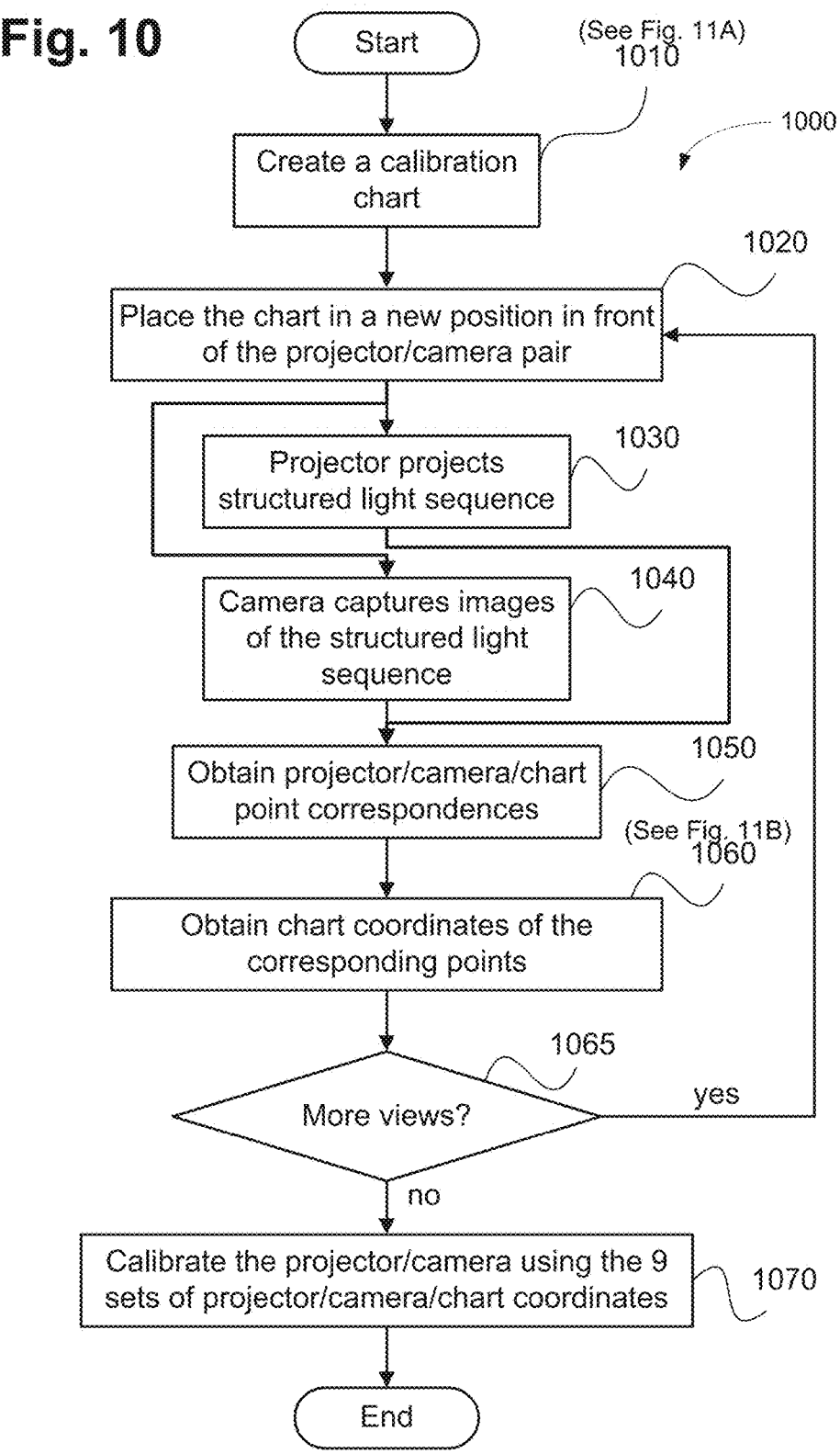
FIG. 10 is a schematic flow diagram illustrating an example of a process of projector-camera intrinsic/extrinsic calibration.

FIG. 10: Obtain the Intrinsic and Extrinsic Parameters of a Projector-Camera Pair FIG. 10 is a schematic flow diagram illustrating a process 1000 for projector-camera calibration. The purpose of projector-camera calibration is to determine the respective intrinsic matrices $A_p$, $A_c$, of the projector and camera, and also the pose of the camera relative to the projector, $R_c$, $T_c$. During the projector-camera calibration process 1000 the projector is considered to be located at the 3D physical world coordinate system origin and un-rotated with respect to the 3D physical world coordinate system. Hence, during the projector-camera calibration process 1000, the projector's pose is defined by rotation matrix $R_p$ equal to the 3×3 identity matrix and translation vector $T_p$ equal to the 3×1 zero vector (0, 0, 0). The output of process 1000 is a pinhole model for both the projector and camera being calibrated. The process 1000 starts at a calibration chart creation step 1010.

At the calibration chart creation step 1010 a calibration chart is manually created. A calibration chart is a piece of sturdy physical planar material having a surface that has a calibration pattern printed on it, described hereinafter in more detail with reference to FIG. 11A. Following creation of the calibration chart, processing continues to a chart positioning step 1020. At the step 1020 the calibration chart is placed within view of the camera (which in the preferred ARPS arrangement is part of a projector/camera pair) so that the projected image falls on the calibration chart. The four corners of the calibration chart must be inside the camera view. The calibration chart must remain stationary at the placed position. Following this, processing continues at concurrent projection and capturing steps 1030 and 1040.

The concurrent respective projection and capturing steps 1030 and 1040 involve simultaneous projection and capture of a sequence of structured light patterns. At the projection step 1030 the projection controller 130 projects a sequence of structured light patterns onto the calibration chart. The purpose of the structured light sequence is to establish point correspondence between projector image pixels and camera image pixels. Gray code is a well-known structured light technique that may be employed at the projection step 1030. The Gray code technique encodes each projector image pixel position, (px, py), as a temporal sequence of binary (on/off) light patterns. At the capturing step 1040, the sequence of structured light patterns projected at the step 1030 are captured by a camera thus forming a sequence of captured images. Following simultaneous projection and capture of the sequence of structured light patterns at the concurrent respective projection and capturing steps 1030 and 1040, processing continues to a point correspondence determination step 1050.

At the point correspondence determination step 1050, the projector controller 130 decodes the sequence of captured structured light patterns. For each camera pixel, (cx, cy), the ARPS algorithm decodes corresponding projector pixel coordinates using the Gray code decoding method. Due to noise, loss in resolution or loss in light contrast, not every camera pixel can be decoded reliably. Unreliable decoding can be detected within a captured image when contrast between on/off light patterns becomes low (for example, if contrast is less than 5 grey levels within the captured camera image). The camera image coordinates of reliably decoded camera pixels, and corresponding decoded projector pixel coordinates are stored as a list of corresponding points (cx, cy, px, py), in RAM of controller 130 such as 2006 in FIG. 20A.

In one ARPS arrangement, an additional "phase shift" structured light technique may be used at the steps 1030-1050 to acquire point correspondences (cx, cy, px, py) of higher accuracy than those obtained by the Gray code algorithm alone. One such "phase shift" structured light algorithm is published in "Zhang, Song; Composite phase-shifting algorithm for absolute phase measurement; Optics and Lasers in Engineering 50.11 (2012): 1538-1541". Other structured light techniques can be used at the steps 1030-1050. Following the point correspondence determination step 1050, processing continues to a chart coordinate determination step 1060.

At the chart coordinate determination step 1060, described in further detail with reference to FIG. 11B, calibration chart coordinates corresponding to camera image positions (cx, cy) are determined. For each position (cx, cy) stored in the RAM 2006 at the point correspondence determination step 1050, corresponding calibration chart coordinates (bx, by) are determined. Thus, a 3-way set of correspondences (cx, cy, px, py, bx, by) are determined and are stored in the RAM 2006 by the controller 130. Following the chart coordinate determination step 1060 processing continues to a decision step 1065.

At the step 1065, it is determined whether more views of the calibration chart are required. In one ARPS arrangement, processing repeats for 9 views of the calibration chart, where the chart is positioned at a unique position/orientation for each view. If more views of the calibration chart are required, then processing follows a YES arrow and continues to the step 1020. If no more views are required, then processing follows a NO arrow and continues to a projector/camera calibration step 1070.

At the step 1070, 9 views of the calibration chart will have been processed at the steps 1020 to 1060, to obtain nine sets of corresponding points (cx, cy, px, py, bx, by). It is possible to repeat the processes more than nine times to achieve a better accuracy. The step 1070 uses the nine sets of corresponding points (cx, cy, px, py, bx, by), to determine the intrinsic matrix of the projector, $A_p$, the intrinsic matrix of the camera, $A_c$, the rotation matrix $R_c$ and the translation vector $T_c$ that map projector coordinates to camera coordinates.

To obtain $A_p$, an intrinsic calibration is performed using the nine sets of point correspondences (px, py, bx, by) mapping from projector image coordinates (px, py) to calibration chart coordinates (bx, by). Intrinsic calibration can be performed using the cvCalibrateCamera2( ) function provided by OpenCV. OpenCV is an open source computer vision library freely available at www.opencv.org. The output of cvCalibrateCamera2( ) includes $A_p$, and nine poses of the projector relative to the calibration chart.

To obtain $A_c$, an intrinsic calibration is performed using the nine sets of point correspondences (cx, cy, bx, by) mapping from camera image coordinates (cx, cy) to calibration chart coordinates (bx, by). Again, the cvCalibrateCamera2 function of the OpenCV library may be used to perform intrinsic calibration. The output of cvCalibrateCamera2( ) will include $A_c$, and the nine poses of the camera relative to the calibration chart.

Given the nine above-noted pairs of poses of the projector and camera relative to the calibration chart, the controller 130 determines the pose of the camera relative to the projector (that is the quantities $R_c$ and $T_c$). $R_c$ and $T_c$ may be used to transform 3D points from the projector's 3D coordinate system to 3D coordinates relative to the camera. As described earlier, during the projector-camera calibration process 1000 the projector is considered to be located at the 3D physical world coordinate system origin and un-rotated with respect to the 3D physical world coordinate system. Hence, during the projector-camera calibration process 1000, the projector's pose is defined by rotation matrix $R_p$ equal to the 3×3 identity matrix and translation vector $T_p$ equal to the 3×1 zero vector (0, 0, 0).

At step 1070, the projector's pinhole model $A_p$, $R_p$, $T_p$ and the camera's pinhole model $A_c$, $R_c$, $T_c$ are stored in RAM associated with the controller 130, and are also stored in non-volatile memory of the controller 130 for later use.

The process 1000 then proceeds to a stop step.

Figure 11A:
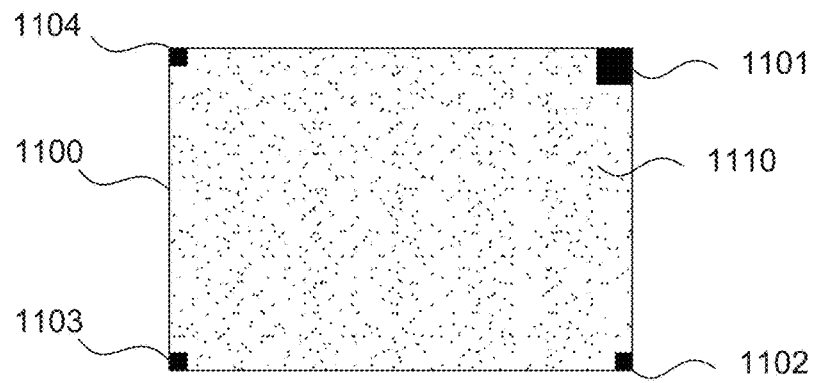
FIG. 11A shows a printed 2D ruler calibration chart used in the projector-camera intrinsic/extrinsic calibration.

FIG. 11: Printed 2D Ruler Calibration Chart for Projector-Camera Calibration FIG. 11A shows a 2D ruler calibration chart 1100 for projector-camera calibration. The calibration chart 1100 may be printed using a laser printer or a large format printer. After printing, the calibration chart 1100 may be affixed to a flat, manoeuvrable board using adhesive glue. To allow accurate calibration, it is important that the calibration chart 1100 is flat and not bowed or deformed. The printed calibration chart 1100 may be used to perform intrinsic and extrinsic calibration of the projectors 111 and 112 and the cameras 121 and 122. One fiducial marker 1101 is placed on the top right corner of the chart 1100. For example, this fiducial marker could be a solid black square of a known physical size. Three additional fiducial markers 1102-1104 are placed in the remaining three corners of the chart 1100. These three fiducial markers 1102-1104 have a different and distinguishable appearance to the marker 1101. For example, the three fiducial markers 1102-1104 can be solid black squares substantially smaller in size than the marker 1101. The interior of the chart 1100 contains a position encoding dot pattern 1110. An example of such a dot pattern is the "2D ruler" technology described in U.S. Pat. No. 7,907,795, "Two-dimensional measurement system".

Figure 11B:
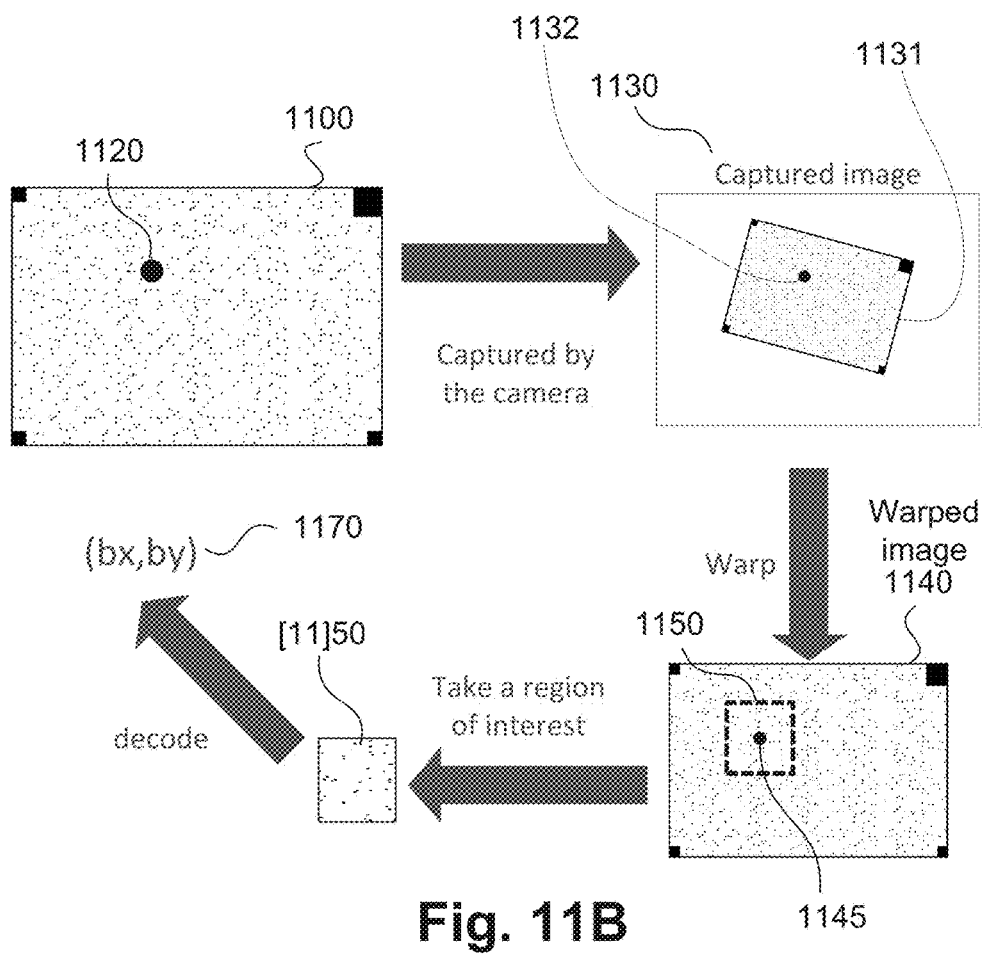
FIG. 11B shows a schematic diagram of an example of a process of capturing and decoding images of a printed 2D ruler calibration chart, as may be used in projector-camera intrinsic/extrinsic calibration.

FIG. 11B illustrates how the position encoding dot pattern 1110 of the calibration chart 1100 may be decoded. One or more projector pixels having known projector image coordinates project light onto the calibration chart 1100. The light forms a projected light pattern 1120 on the calibration chart 1100. Let (px, py) denote known projector image coordinates associated with a particular position within light pattern 1120. The calibration chart 1100 along with the light pattern 1120 are then captured by a camera (for example, the camera 121) forming a captured image 1130. Because the camera is typically not perfectly orthogonal to the calibration chart 1120, the calibration chart may appear in the shape of a trapezium 1131 within the captured image 1130.

A computing device, for example, the projector controller 130, detects the light pattern 1120 within captured image 1130 at 1132, and determines projector image coordinates (px, py) associated with the light pattern 1120 and corresponding camera image coordinates (cx, cy). The computing device also detects the four fiducial markers 1101-1104 within the captured image 1130, and uses these detected markers to warp (i.e. transform) the captured image 1130 to form a warped image 1140. The warped image 1140 has a predetermined size which corresponds to the size of the calibration chart 1100 expressed in 2D ruler dots. For example, if the size of the calibration chart 1100 is 1000× 800 millimeters and each 2D ruler dot is 2×2 millimeters in size, then a warped image size of 500×400 pixels is appropriate. Such an image warp may be performed by fitting a homography transformation to the positions of the 4 detected markers 1101-1104 within the captured image 1130 and their known corresponding positions in the warped image 1140.

The cvGetPerspectiveTransform( ) and cvWarpPerspective( ) functions of the OpenCV library may be used to fit a homography transform and to warp an image accordingly. The warp step transforms the captured image 1130 of the calibration chart 1100 such that it appears rectangular, not trapezoidal, and of a fixed size and orientation within the warped image 1140. A position 1145 within the warped image 1140 corresponding to the projected image position (px, py) within the light pattern 1120 is determined by transforming camera image position (cx, cy) using the determined homography transform. A region of interest rectangle 1150 is defined such that the centre of the region of interest coincides with the position 1145 of the light pattern in the warped image 1140. The region of interest is denoted by coordinates (wx1, wy1, wx2, wy2), being the left, top, right, and bottom coordinates respectively of the region of interest rectangle. 2D ruler technology is then used to decode the region of interest 1150, thus determining calibration chart coordinates (bx, by) 1170 corresponding to the camera image position (cx, cy) and the projector image position (px, py) of the light pattern 1120. 2D ruler decoding also determines a confidence value, s indicating reliability of the decoded result position (bx, by).

The 2D Ruler calibration pattern 1100 comprises horizontal and vertical repetitions of three different tiles. Each tile is of a different size, such that the tile sizes are pairwise coprime. Each tile contains a number of dots of distinguishable intensity. The region of interest 1150 is correlated with each of the three tiles. For example, 2D phase correlation may be performed to determine an x, y circular shift between each tile and the region of interest 1150. The three circular shifts may be processed using the Chinese Remainder Theorem to determine a position coordinate 1170 corresponding to a centre position 1145 of the region of interest 1150. A confidence value, s, may be used to identify decoded points that are considered less reliable. Typically a predetermined threshold may be chosen to filter decoded points based on a corresponding s value. Decoded points that are considered less reliable should be discarded and not used in subsequent processing steps.

The result of each decode determines a correspondence between a camera image position (cx, cy), a projector image position (px, py) and a calibration chart position (bx, by). Calibration chart coordinates (bx, by) are typically expressed in physical units of length such as millimeters (mm). The decoding process is performed for multiple regions of interest 1150, each centred about a unique centre position 1145 within the warped image 1140. Each such decode will correspond to a unique projector image positions (px, py), a unique camera image position (cx, cy) and a unique chart coordinate (bx, by). Thus a set of many correspondences (cx, cy, px, py, bx, by) is determined.

The light pattern in the warped image 1140, which is also in the region of interest 1150, may influence the accuracy of the position decoding algorithm. One method to improve the accuracy is by capturing another identical image of the calibration chart 1100 while the light pattern is not being projected.

FIG. 2: Alignment Example

FIG. 2A shows an example of a content image 200 to be displayed using the multi-projector system 100. The content image 200 has a wide aspect ratio, and is therefore optimally displayed using a multi-projector system consisting of two projectors side-by-side, such as the multi-projector system 100, each of the projectors 111, 112 projecting a respective portion 201, 202 of the image 200 onto a projection surface 160.

FIG. 2B illustrates projection of the content image 200 using two projectors, for example, the projectors 111 and 112 of the multi-projector system 100. Each of the projectors 111, 112 produces a respective projected portion 221, 222 of the respective portions 201, 202 of the content image 200 on the projection surface 160. The projector image projected by the left-hand projector 111 on to the projection surface 160 is shown in FIG. 2B as the projector image 231 (which is also equivalent to the projection area associated with the projector 111). The projector image projected by the right-hand projector 112 on the projection surface 160 is shown in FIG. 2B as the projector image 232 (which is equivalent to the projection area associated with the projector 112). Each projector image 231 and 232 comprises a rectangular array of projector pixels, for example 1920 horizontal pixels by 1200 vertical pixels. Each projector pixel is controlled by a number of values representing intensity of particular colour channels. For example, each projector pixel may comprise 1 byte (8 bits) for a red colour channel, 1 byte for a blue colour channel and 1 byte for a green colour channel. If the left-hand projector 111 were to project all pixels of the projector image 231, it would result in a large trapezoidal shape 211 on the projection surface 160. Similarly, if the right-hand projector 112 were to project all pixels of the projector image 232, it would result in a large trapezoidal shape 212 on the projection surface 160. The union of the trapezoidal shape 211 and the trapezoidal shape 212 (or equivalently the union of the projector image 231 and the projector image 232) is referred to as the combined projection area of the two projectors 111 and 112. The projection controller 130 therefore displays the content image 200 using a subset of pixels of each of the projector images 231 and 232. Each subset of pixels therefore represents a portion of the content image, and each projector image is said to include a portion of the content image.

The left-hand projector 111 includes two regions 241 and 242 for displaying two portions of the content image 200 in its projector image 231. The first region 241 contains a portion of the content image 200 that is only projected by the left-hand projector 111. The second region 242 contains a portion of the content image 200 that is projected by both the left-hand projector 111 and the right-hand projector 112. The first region 241 of the projector image 231 is projected onto a region 221 of the projection surface 160. The second region 242 of the projector image 231 is projected onto a region 223 of the projection surface 160.

The right-hand projector 112 includes two regions 243 and 244 for displaying two portions of the content image 200 in its projector image 232. The first region 243 contains a portion of the content image 200 that is only projected by the right-hand projector 112. The second region 244 contains a portion of the content image 200 that is projected by both the left-hand projector 111 and the right-hand projector 112. The first region 243 of the projector image 232 is projected onto a region 222 of the projection surface 160. The second region 244 of the projector image 232 is projected onto a region 223 of the projection surface 160.

The projected regions 221-223 are aligned on the projection surface 160, such that the overall projected image is upright, and includes no seams between the regions 221-223. Both the projectors 111 and 112 project the same portion of the content image onto the projected region 223. This region corresponds to the region 242 of the left-hand projector image 231 and the portion 244 of the right-hand projector image 232. This overlap of projection is known as "blending". The projection region 223 is therefore known as a "blend region". Within the blend region 223, both the projectors 111 and 112 are said to "contribute" to the projected image.

The blend region 223 is also commonly known as the "overlap region" or "overlap area". In other ARPS arrangements, the overlap region is the intersection of the regions of the surface that can potentially be projected onto by each of the projectors. For example, with reference to FIG. 2B, the overlap area may be considered to be the intersection of the regions 211 and 212, which contains the blend region 223.

The projection controller 130 controls which portions of the content image 200 are included in each projector image 231 and 232, and the boundaries of the regions 241-244 of the content image 200—within each projector image 231 and 232. The projection controller 130 uses this control to ensure that the projected regions 221-223 are aligned on the projection surface 160.

The ARPS arrangement is a method of refining the alignment of the regions 221-223 of a content image 200 projected by the multi-projector system 100, as performed by the projection controller 130.

FIG. 3: Calibration Pattern Example

As discussed earlier with reference to FIG. 1, a calibration pattern is embedded in a projected portion of a content image. A camera captures one or more images of the projected content image, and the embedded calibration pattern is recovered. The calibration pattern is decoded, and is used to perform alignment.

Figure 3A:
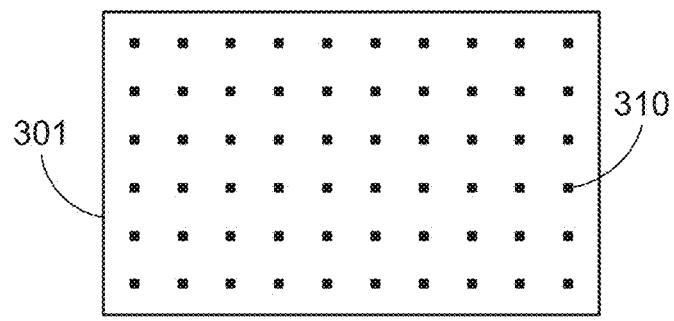
FIG. 3A shows an example of a calibration pattern consisting of a grid of calibration marks

FIG. 3A shows an example 301 of a calibration pattern. A calibration pattern typically consists of one or more calibration marks, which can be processed to determine a position within the calibration pattern. The example calibration pattern 301 consists of a simple grid of points or dots (each mark is a dot), for example, a dot 310. A dot is a small group of pixels of a contrasting intensity in comparison with surrounding pixels. For example a dot may be square shaped, consisting of 4×4 projector pixels. In this example, one can convert a projector image coordinate to a calibration pattern coordinate by simply dividing the projector image coordinate by 4. The dimensions (size) of dots should be chosen such that dots are detectable in captured camera images of the projected calibration pattern. Other calibration patterns may consist of dots at random, pseudo-random or otherwise distributed positions. Furthermore, other types of calibration marks may include shapes such as circles, irregular shapes, stripes and so on. The calibration pattern 301 is preferably the same size as the projector images 231 and 232. This enables a position in a projector image to be determined, by processing the dots in a calibration pattern, for example, captured by a camera such as the camera 121.

The calibration pattern 301 is preferably embedded in a projected portion of a content image. It is preferable that a viewer is not able to perceive the presence of the calibration pattern 301. "Pattern subtraction" is a known technique for making a projected calibration pattern imperceptible. In two consecutive frames of projected content, the calibration pattern 310 is added and subtracted from the intensity values of the projector image. A projected image with a calibration pattern added is known as a "positive frame". A projected image with a calibration pattern subtracted is known as a "negative frame". When the frames are projected at a high frame rate (e.g. 120 Hz) a viewer will not perceive the presence of the calibration pattern. The camera captures each positive and negative frame individually.

The projection controller 130 subtracts the captured negative frame from the captured positive frame, which results in a "subtracted frame". The subtracted frame typically contains the calibration marks, with the projected content substantially removed. Due to camera sensor noise, lighting variation, etc., the subtracted frame may contain noise, and the calibration marks in the captured frame may be of reduced intensity compared with the projected calibration marks. The subtracted frame is then processed by the projection controller 130.

Figure 3B:
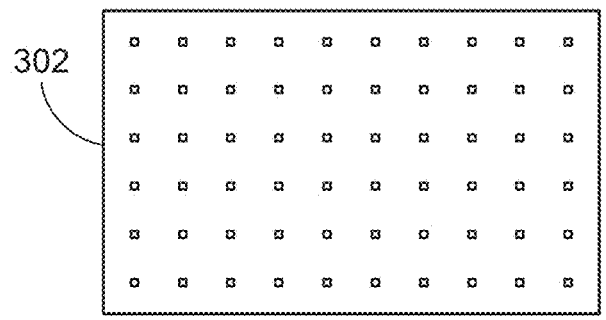
FIG. 3B shows an example of a calibration pattern corresponding to the calibration pattern of FIG. 3A, in which the calibration marks are added to a projector image.

FIG. 3B shows a representation 302 of the calibration pattern 301, where the calibration marks are added to the projected content, to project a positive frame. Each mark in a positive frame has a corresponding mark in a negative frame.

Figure 3C:
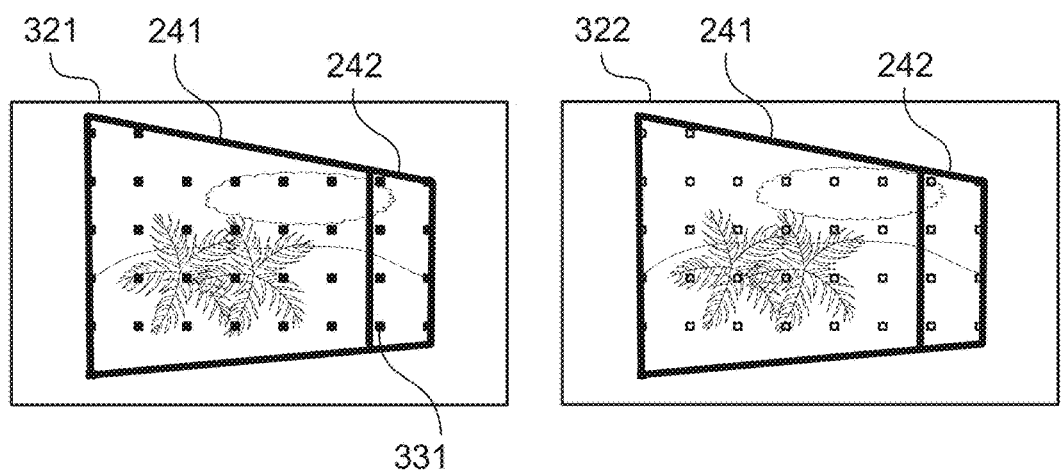
FIG. 3C shows an example of a negative frame and a positive frame, each consisting of a projector image and an embedded calibration pattern.

FIG. 3C shows an example of a negative frame 321 and a positive frame 322. The negative frame 321 consists of the calibration pattern 301 subtracted from the projector image 231. The positive frame 322 consists of the calibration pattern 301 added to the projector image 231. Preferably, the calibration marks are only subtracted or added where a portion of the content image 200 is displayed (e.g. within the portions 241 or 242).

Preferably, a calibration pattern is projected by each projector in sequence. For example, the left-hand projector 111 may first project the calibration pattern, consisting of the negative frame 301 followed by the positive frame 302. Then, the right-hand projector 112 may project the calibration pattern, again consisting of the negative frame 301 followed by the positive frame 302. An image of each projected calibration pattern is produced by one or more cameras. For example, a calibration pattern projected by the left-hand projector 111 may be captured by both the left-hand camera 121 and the right-hand camera 122.

In order to make the calibration pattern less noticeable to viewers FIG. 3C shows a configuration where calibration marks outside of the portion of the content image 200 are omitted. Alternatively, if visibility of dots is not of concern, it is possible to configure the system so that all calibration marks are projected.

FIG. 4: Example of Capture, Subtraction

Figure 4A:
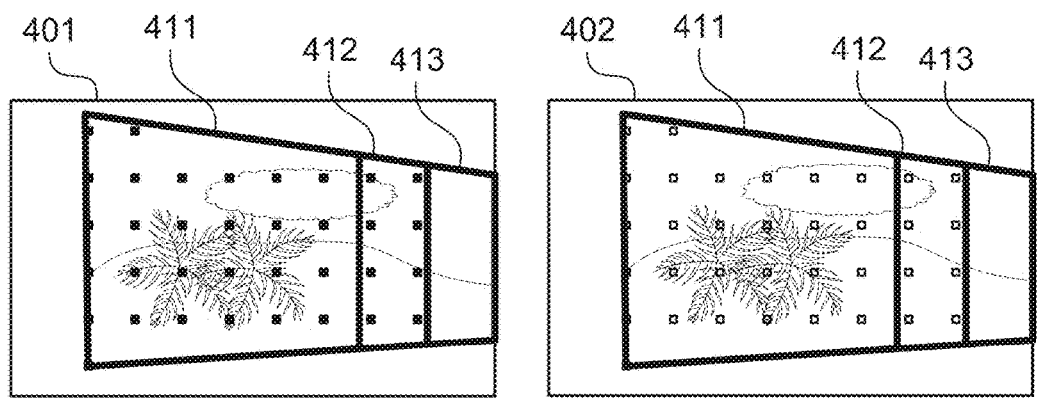
FIG. 4A shows an example of a captured negative frame and a captured positive frame, captured by a camera within the multi-projector system shown in FIG. 1.

FIG. 4A shows an example of a captured negative frame 401 and a captured positive frame 402. In the example shown in FIG. 4A the captured frames 401 and 402 are captured by the left-hand camera 121, and are received by the projection controller 130. Each captured frame 401 and 402 contains three regions: a region 411 that is projected with the left-hand projector 111 only, a region 412 that is projected with both projectors 111 and 112 (the blend region), and a region 413 that is projected with the right-hand projector 112 only. Since only the left-hand projector 111 is projecting a calibration pattern, the captured frames contain calibration marks in only regions 411 and 412 that are projected with the left-hand projector 111. The captured negative frame 401 contains regions of the content image 200 with the calibration marks subtracted. The captured positive frame 402 contains regions of the content image 200 with the calibration marks added.

Figure 4B:
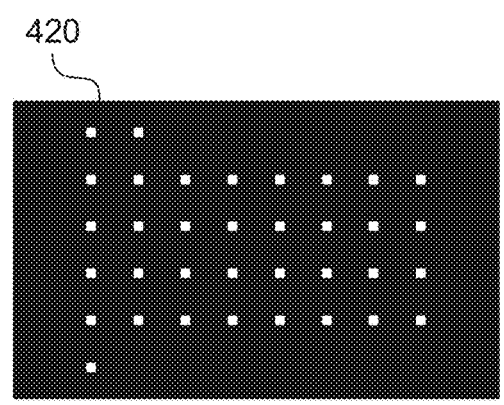
FIG. 4B shows an example of a subtracted frame, formed by subtracting a captured negative frame from a captured positive frame.

FIG. 4B shows an example of a subtracted frame 420. The subtracted frame 420 is created by the projection controller 130 by subtracting the captured negative frame 401 from the captured positive frame 402. The subtracted frame 420 therefore contains calibration marks of the calibration pattern 301, perhaps with reduced intensity compared with the projected calibration pattern. The subtracted frame 420 may also contain noise, as described previously.

As described earlier, a blend region is projected by two or more projectors. The contribution of each projector projecting in the blend region is lowered, so that the overall intensity in the blend region is equivalent to the intensity of a single projection. The calibration pattern obtained in the subtracted frame 420 may be further processed, decoded and used to perform alignment.

FIG. 5: Projected 2D Ruler Pattern

Figure 5A:
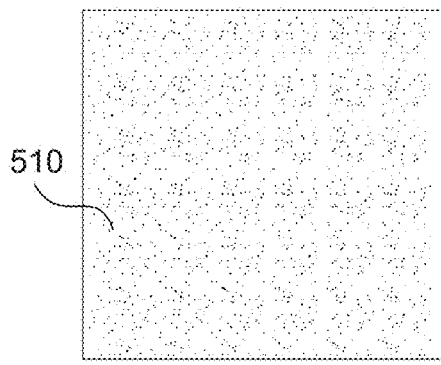
FIG. 5A shows a 2D ruler calibration pattern used in projection.

FIG. 5A shows a 2D ruler calibration pattern 510, which can in one example be based on "2D ruler" technology described in U.S. Pat. No. 7,907,795, "Two-dimensional measurement system". This calibration pattern 510 is similar to the 2D ruler dot pattern 1110 of the calibration chart 1100 of FIG. 11A. However, unlike the calibration chart 1100, the calibration pattern 510 is to be projected rather than printed. The calibration pattern 510 may be projected by the projector 111 or 112.

Figure 5B:
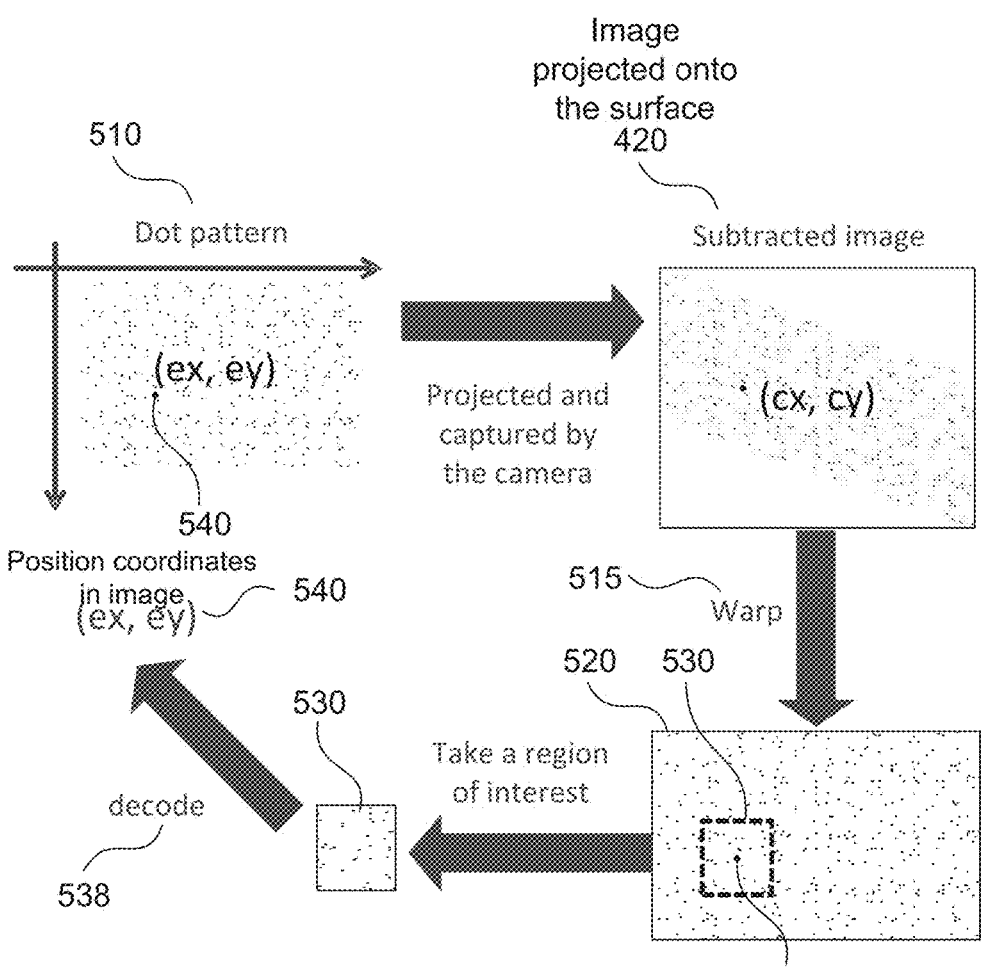
FIG. 5B shows a schematic diagram of the process of projecting, capturing and decoding a 2D ruler calibration pattern.

FIG. 5B illustrates how the dot pattern 510 may be decoded. A digital version of the dot pattern 510 is stored in digital form in memory 2006 of the projector controller 130. This dot pattern 510 is then embedded in the portion of the content image (e.g. the portion consisting of regions 241 and 242). The portion of the content image and the embedded dot pattern 510 are then projected by a projector, for example the projector 111, onto a projection surface, for example the surface 160. The projection is then captured by a camera, for example the camera 121. To aid recovery of the projected dot pattern 510, this process of projection and subsequent capture is performed for both a projected negative frame 321 and a projected positive frame 322 of the dot pattern 510. Finally, a subtracted image 420 is formed by subtracting the captured negative frame 401 from the captured positive frame 402.

Because the projection surface 160 may not be parallel to the projector image plane or the camera image plane, the 2D ruler dot pattern 510 may appear to be non-rectangular in shape in the subtracted image 420. The dot pattern 510 in the subtracted image 420 may be warped (transformed) to be a rectangle 520 using a warp operation 515.

An appropriate warp 515 can be determined by finding 4 pairs of corresponding points in the camera image and the projected 2D ruler pattern and fitting a homography transform to these points. For example, positions of the 4 corners of the projected 2D ruler pattern in the subtracted image 420 may be detected and paired with corresponding corner positions in the 2D ruler dot pattern 510. The cvGetPerspectiveTransform( ) and cvWarpPerspective( ) functions of the OpenCV library may be used to fit a homography transform and to warp an image accordingly. The warp step transforms the subtracted image 420 of the 2D ruler pattern 510 such that it appears rectangular, not trapezoidal, and of a fixed size and orientation within the warped image 520.

A region of interest 530 about a centre position 535 may be defined within the warped image 520. The 2D ruler technology is then used to decode 538 the dot pattern within the region of interest 530. The result of decoding the region of interest 530 is the position coordinates (ex, ey) 540 corresponding to the centre 535 of region of interest 530 in the original dot pattern 510. The relationship between the position coordinates (ex, ey) 540 of the original dot pattern 510 and the projector image coordinates (px, py) is known and may be a 1-to-1 mapping or may involve scaling of ex and ey components to thus determine (px, py). For example, if each 2D ruler dot of the projected 2D ruler pattern comprised 4×4 projector image pixels, then conversion from position coordinates (ex, ey) 540 to projector image coordinates (px, py) may simply involve multiplying by 4. Hence, after decoding, the projector image coordinates (px, py) corresponding to the centre 535 of the region of interest 530 are determined. The camera image coordinates (cx, cy) corresponding to the centre 535 of region of interest 530 are determined by transforming the centre position 535 by the inverse of the determined warp 515. Hence, a correspondence between the points (cx, cy, px, py) is formed.

In one example, the decoding method can be based on U.S. Pat. No. 7,907,795, "Two-dimensional measurement system". The 2D Ruler calibration pattern 510 comprises horizontal and vertical repetitions of three different tiles. Each tile is of a different size, such that the tile sizes are pairwise coprime. Each tile contains a number of dots of distinguishable intensity. The region of interest 530 is correlated with each of the three tiles. For example, 2D phase correlation may be performed to determine an x, y circular shift between each tile and the region of interest 530. The three circular shifts may be processed using the Chinese Remainder Theorem to determine a position coordinate 540 corresponding to the centre position 535 of the region of interest 530. A confidence value, s, is also an output of the decoding process and may be used to identify decoded points that are considered less reliable. Typically a predetermined threshold may be chosen to filter decoded points based on corresponding s value. Decoded points that are considered less reliable should be discarded and not used in subsequent processing steps.

The result of each decode determines a correspondence between a camera image position (cx, cy) and a projector image position (px, py). The decoding process may be performed many times, each time using a unique region of interest 530 centred about a unique centre position 535 within the warped image 520. Each such decode will correspond to a unique projector image positions (px, py) and a unique camera image position (cx, cy). Thus a set of many point correspondences (cx, cy, px, py) is determined.

To ensure that the set of correspondences (cx, cy, px, py) are evenly distributed, a sampling grid may be used to determine the locations of sampling points, where sampling points exist where horizontal and vertical sampling grid lines intersect. The sampling grid may be defined in either the subtracted image 420 or in the warped image 520 space. Assuming that the sampling grid is defined in the warped image 520, let us define (wx, wy) as a sampling point position within the warped image 520. The size of sampling grid cells (i.e. distance between grid lines) determines the density of the resultant set of point correspondences. For example, a sampling grid using a grid cell size of 50 pixels may be used. Because the warping transformation 515 used to warp the subtracted image 420 to the warped image 520 is known, corresponding camera image coordinates (cx, cy) may be determined for each of the (wx, wy) by applying the inverse of the warp transformation 515 to each (wx, wy). A region of interest 530 is defined for each sample position (wx, wy) in the warped image 520. After decoding all such regions of interest, the projector image coordinates (px, py) corresponding to the centre 535 of each region of interest 530 are determined. The pairs of corresponding points (cx, cy, px, py) form a set of point correspondences between the camera image and the projector image.

Figure 12A:
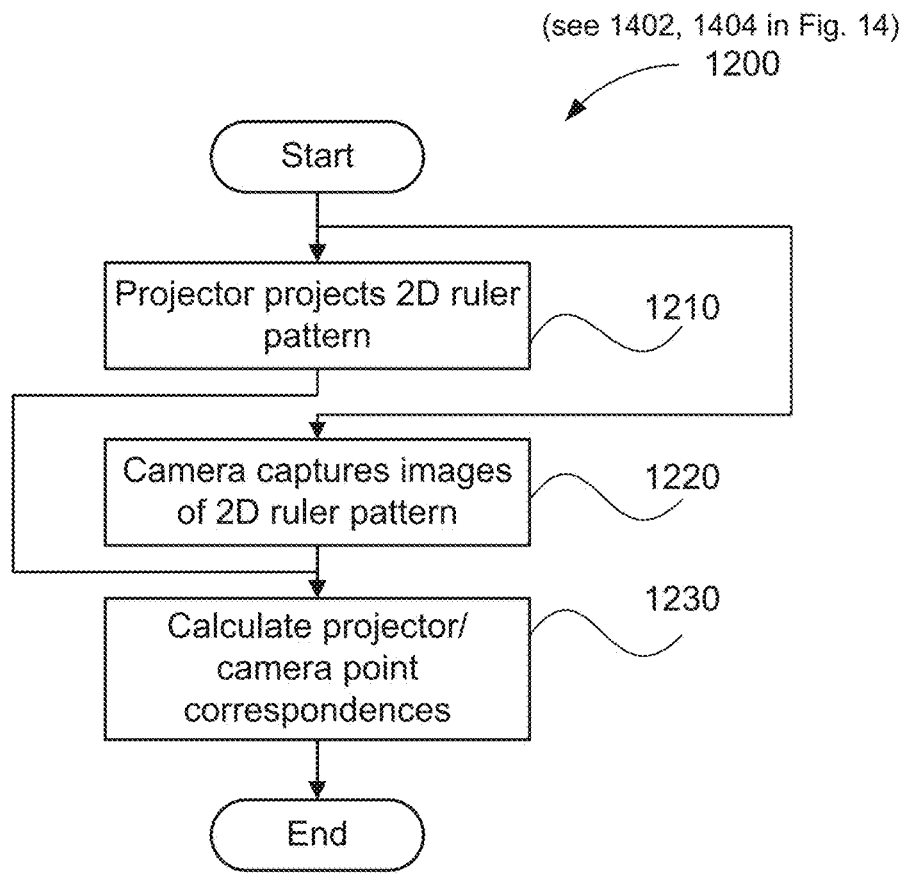
FIG. 12A is a schematic flow diagram illustrating the process of obtaining a set of point correspondences using a projector and a camera.

FIG. 12A: Obtain a Set of Point Correspondences Using a Projector and Camera

FIG. 12A is an example of a flow chart of a process 1200 for obtaining a set of point correspondences using a 2D ruler pattern. The process 1200 may be performed using any camera and projector of the multi-projector system 100 as long as the camera has at least a partial view of the projector's projection region. For example, the left-hand projector 111 and the left-hand camera 121 may be used. Alternatively, in some situations, the process may be performed across devices, for example using the left-hand projector 111 and the right-hand camera 122.

The process 1200 starts at concurrent respective projection and capture steps 1210 and 1220 where a 2D ruler pattern is simultaneously projected and captured.

At the projection step 1210, a 2D ruler pattern is projected, for example by the projector 111. To project the 2D ruler pattern, the pattern is first embedded into the portion of the content image projected by the projector, as has been described with reference to FIG. 3. At the projection step 1210, both a positive frame 321 and a negative frame 322 are projected.

Concurrently with the projection step 1210, at the capture step 1220, images of the 2D ruler pattern projected at the step 1210 are obtained using the camera, for example 121, and a subtracted frame is calculated. Captured images of 2D ruler patterns and formation of a subtracted image have been described with reference to FIGS. 4A and 4B. In summary, both a captured negative frame 401 and a captured positive frame 402 are captured. The captured negative frame 401 is subtracted from the captured positive frame 402 resulting in a subtracted frame 420. After projection and capture of the 2D ruler pattern at the steps 1210 and 1220, processing continues at a projector/camera point correspondence determination step 1230.

At the step 1230, the subtracted image is decoded a number of times, thus forming a set of point correspondences (cx, cy, px, py) between the camera image and the projector image. Decoding of a projected 2D ruler pattern has been described with reference to FIG. 5B. After a set of point correspondences (cx, cy, px, py) has been determined, the process 1200 is directed to an END step and is complete.

Figure 12B:
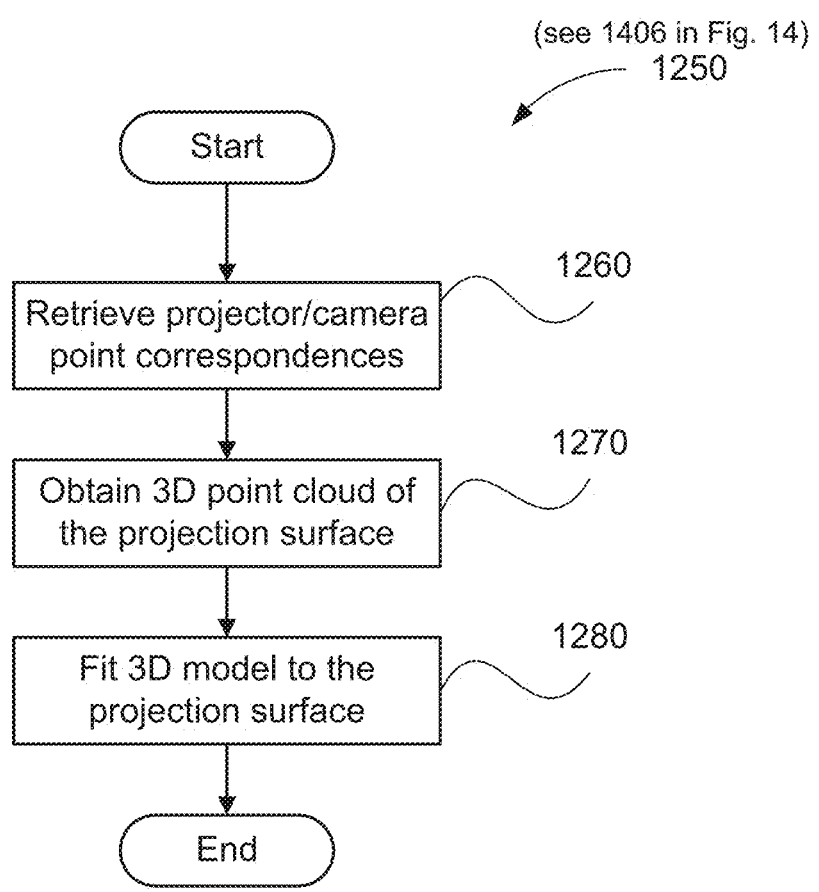
FIG. 12B is a schematic flow diagram illustrating the process of obtaining a 3D model of the projection surface from a set of point correspondences obtained from a projector and camera.

FIG. 12B: Obtain a 3D Model of the Projection Surface from a Set of Point

FIG. 12B is an example of a flow chart of a process 1250 of obtaining a 3D model of the projection surface 160.

The process 1250 starts at a point correspondence retrieval step 1260. At the step 1260, a set of point correspondences (cx, cy, px, py) are obtained. The process 1200 depicted in FIG. 12A may be used to obtain the set of point correspondences (cx, cy, px, py).

Processing continues at a 3D point cloud determination step 1270. The step 1270 converts the point correspondences into a set of 3D points, called a 3D point cloud. Based on the concept of stereo vision, the 3D coordinates of a point may be determined from two known projections of the 3D point in two known views (image planes). This process of obtaining 3D coordinates is called triangulation. Triangulation may for example be performed using the cvTriangulatePoints( ) function of the OpenCV library. Given a set of point correspondences (cx, cy, px, py) between camera image and projector image, and projector-camera intrinsic and extrinsic calibration parameters, the cvTriangulatePoints( ) function determines a set of 3D points (X, Y, Z) corresponding to the projection surface 160. This set of 3D points is collectively called a "point cloud". The present specification assigns the 3D coordinate frame of the projector to be the origin position (0, 0, 0) of physical coordinates of a point cloud. After determining the point cloud, processing continues at a 3D model fitting step 1280.

At the step 1280, since the point cloud is only a discrete sampling of the actual 3D continuous surface, a 3D model is fitted to the point cloud. The 3D model may be a planar surface, a cylindrical surface, a dome/sphere, or even a 3D mesh surface (as is commonly used in the field of computer graphics). After fitting a 3D model to the point cloud, the 3D coordinates of any point on the projection surface may be determined. After fitting the 3D model to the point cloud, process 1250 is complete.

Overview of the ARPS Arrangement

This ARPS arrangement addresses the specific problem of alignment refinement, in the process of adaptive (i.e. automatic continuous) calibration, without the need to project additional calibration patterns.

Figure 9:
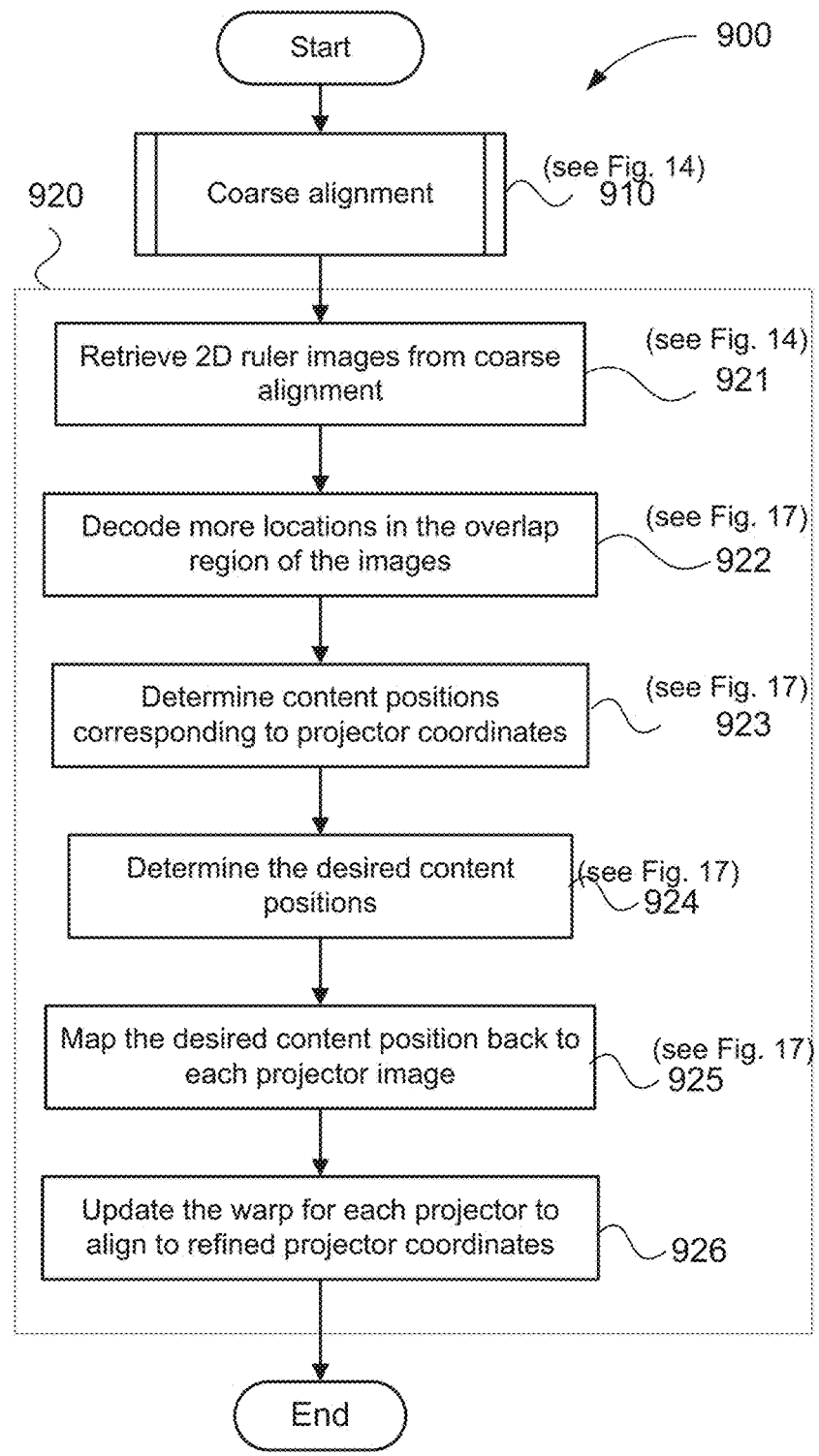
FIG. 9 is a schematic flow diagram illustrating the projector alignment process.

FIG. 9, described hereinafter in more detail, is a flow chart of a high level process for performing an ARPS arrangement.

Figure 6:
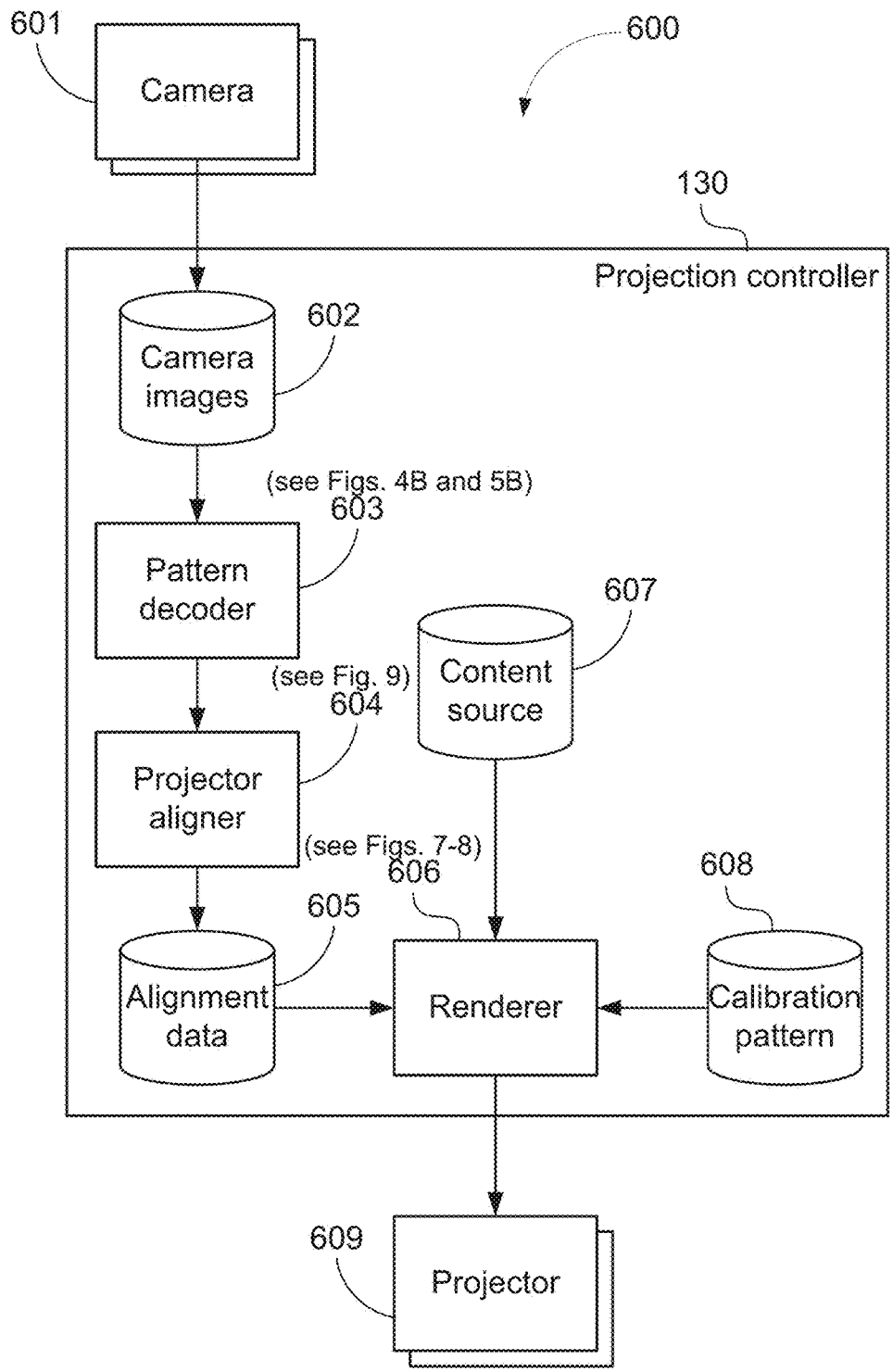
FIG. 6 is a schematic block diagram of a projection controller according to an ARPS arrangement.

FIG. 6: Module Diagram

FIG. 6 shows a schematic functional block diagram of one arrangement 600 of the projection controller 130. The projection controller 130 receives captured images 602 of projected calibration patterns from one or more cameras 601 (e.g. the cameras 121 and 122. The projection controller 130 stores the captured camera images 602 in RAM such as 2006.

A pattern decoder 603 retrieves a corresponding negative frame and positive frame from the stored camera images 602, and creates a subtracted frame, as described previously with respect to FIG. 4B. The pattern decoder 603 then decodes the calibration pattern in the subtracted frame to determine correspondences between camera image positions in the subtracted frame and projector image positions in the projected image, as described previously with respect to FIG. 5B.

Other calibration patterns require different decoding methods. For example, a Gray code calibration pattern requires a sequence of frames to be projected and captured. Each pixel of each frame in the Gray code sequence encodes a specific bit of the pixel's projector image position. The bits are merged over the sequence of frames, resulting in absolute positions in the projector image. Other calibration patterns and decoding methods are possible within the scope of the ARPS arrangement. For example, a pattern of random or pseudo-random dots may provide high alignment accuracy through the use of correlation methods.

A projector aligner 604 receives the correspondences formed by the pattern decoder 603, and determines which portions of the content image should be displayed by each projector, and where in each projector image those portions should be displayed, to achieve precise alignment between the multiple projectors. For example referring to FIG. 2B the projector aligner 604 determines that the projector image 231 of the left-hand projector 111 should display the left-hand portion of the content image 200, within the boundaries of the regions 241 and 242 of the projector image 231. Similarly, the projector aligner 604 determines that the projector image 232 of the right-hand projector 112 should display the right-hand portion of the content image 200, within the boundaries of the regions 243 and 244 of the projector image 232.

It is very important for the projector aligner 604 to determine region boundaries 241-244 with high accuracy. If the boundaries are determined inaccurately, then the image on the surface 160, projected by the multi-projector system 100, will not appear as a single seamless projection and will not closely resemble the content image 200. This ARPS arrangement addresses the specific problem of accurately aligning portions of the content image 200 projected by multiple projectors. This alignment process is explained in detail in FIG. 9.

The projector aligner 604 stores alignment data 605 in RAM, the alignment data consisting of the portions of the content image to be displayed by each projector, where in each projector image those portions should be displayed, and how each portion is to be blended, if the portion is within a blend region.

A renderer 606 receives the alignment data 605 and creates a projector image for each projector. The renderer retrieves the next content image from the content source 607. The content source 607 may be a static image, a video, or any other form of content. The content source may be read from an attached disk drive or non-volatile memory, read from another computing device over a local area network, such as an Ethernet or wireless network, or streamed from a remote computer via the Internet. The frame rate of the content images is preferably lower than the frame rate of the projectors and cameras. The renderer 606 renders the relevant portions of the content image within the regions defined by the alignment data, for each projector image. A calibration pattern 608 may be stored in RAM or ROM as an image, for example a binary mask image comprising of 0's (representing no dot) and 1's (representing the presence of a dot). Alternatively, the calibration pattern 608 may be stored in RAM or ROM as a number of tiles, for example 3 tiles, that are to be repeated horizontally and vertically across the projector image space, thus forming a complete calibration pattern.

After rendering the relevant portions of the content image to the projector image, the renderer 606 retrieves the calibration pattern 608, and embeds the calibration pattern 608 into the projector image, as described previously with reference to FIG. 3C. If the next frame to be rendered is a negative frame, the calibration pattern 608 is subtracted from the projector image. If the next frame to be rendered is a positive frame, the calibration pattern 608 is added to the projector image. The operation of the renderer 606 is described in more detail later with reference to FIGS. 7-8.

Finally, the renderer 606 transmits each projector image to its corresponding projector 609 (e.g. the projector 111 or 112 so that it may be displayed on the projection surface (e.g. the projection surface 160. One type of projection technique involves using Liquid Crystal on Silicon (LCOS) reflective panels to reflect light emitted from a light source. Typically, an LCOS projector uses 3 LCOS panels, one for each colour channel (R, G, B). For an LCOS projector, the renderer 606 may transmit each colour channel (R, G, B) of the projector image over a hardware bus to the drive-circuitry of an LCOS panel. Each LCOS panel may modulate incident light according to received projector image colour channel information. Light reflecting off each LCOS panels may be combined and emitted via a projection lens optical system, thus illuminating the projection surface 160. Other types of projectors can be used and, for example, may use DLP or LCD type panels instead of LCOS panels. The present ARPS arrangement is not limited by the type of projector panel used or by the projection technique employed.

Figure 7:
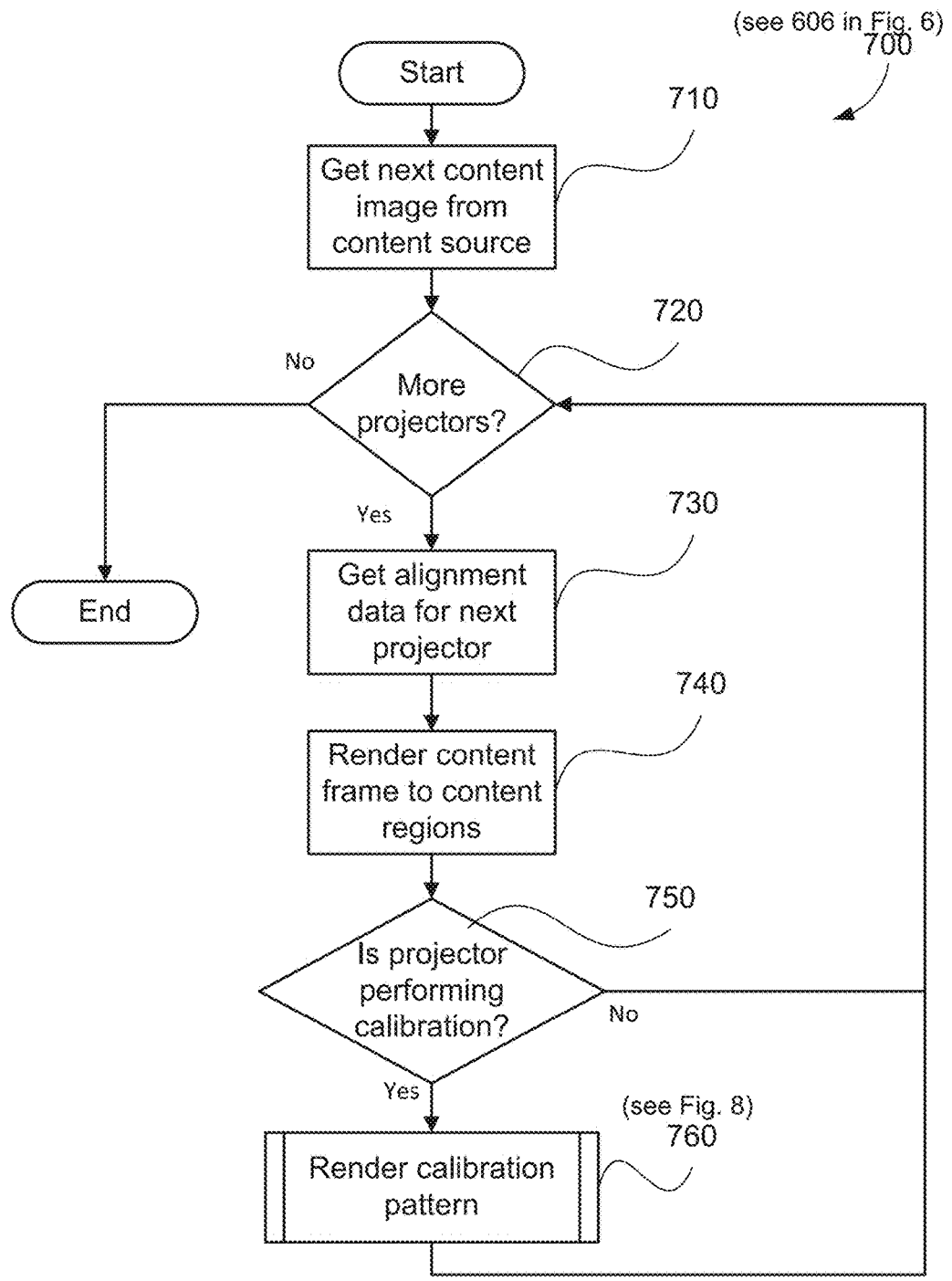
FIG. 7 is a schematic flow diagram illustrating a method of rendering one or more projector images as executed by the renderer module 606 of a projection controller shown in FIG. 6.

FIG. 7: Renderer Flow Diagram

FIG. 7 is an example of a flow chart for a process 700 for rendering one or more projector images as executed by the renderer 606 in FIG. 6. The process 700 starts and proceeds to a content retrieval step 710, where the next content image is retrieved from the content source 607. Processing then proceeds to a projector decision step 720, where it is decided if there are more projectors that require a projector image to be rendered.

If it is determined that there are more projectors that require a projector image to be rendered, the process 700 proceeds to an alignment data retrieval step 730, where alignment data 605 is retrieved for the next projector. As described previously, the alignment data 605 consists of the portions of the content image are to be displayed by the projector, information on where in the projector image those portions should be displayed, and information on how each portion is to be blended, if the portion is within a blend region. The process 700 then proceeds to a rendering step 740.

At the step 740, the content image is rendered into the regions of the projector panel image defined by the alignment data 605. For example, referring to FIG. 2B the renderer 606 renders the left-hand region of the content image 200 to the regions 241 and 242 of the projector panel image 231. Since the region 242 is to be blended with the projection of the right-hand projector 112, a blend function is applied to the region 242. Typically, the blend function will reduce the contribution of the left-hand projector 111 in a direction from left to right.

The Process 700 then proceeds to a decision step 750, where it is decided if the current projector is performing calibration. Preferably, each projector performs calibration at a separate time. Each projector may perform calibration at fixed intervals (e.g. 5 seconds), or when a change to the projector environment is detected (e.g. when one of the projectors is physically moved). When a projector is performing calibration, a calibration pattern is projected by the projector, and the projection is captured by one or more cameras.

If it is determined at the step 750 that the current projector is performing calibration, the process 700 proceeds to a calibration pattern rendering step 760, described hereinafter in more detail with reference to FIG. 8, where the calibration pattern is rendered to the current projector image. Upon completion of the step 760, the process 700 returns to the step 720.

If it is determined at the step 750 that the current projector is not performing calibration, the process 700 returns to the step 720 (a calibration pattern is not rendered).

If at the decision step 720 it is determined that there are no more projectors requiring a projector image to be rendered, the process 700 ends. At this stage, the renderer 606 transmits the rendered projector images to the corresponding projectors 609 (e.g. the projector 111 and 112).

Figure 8:
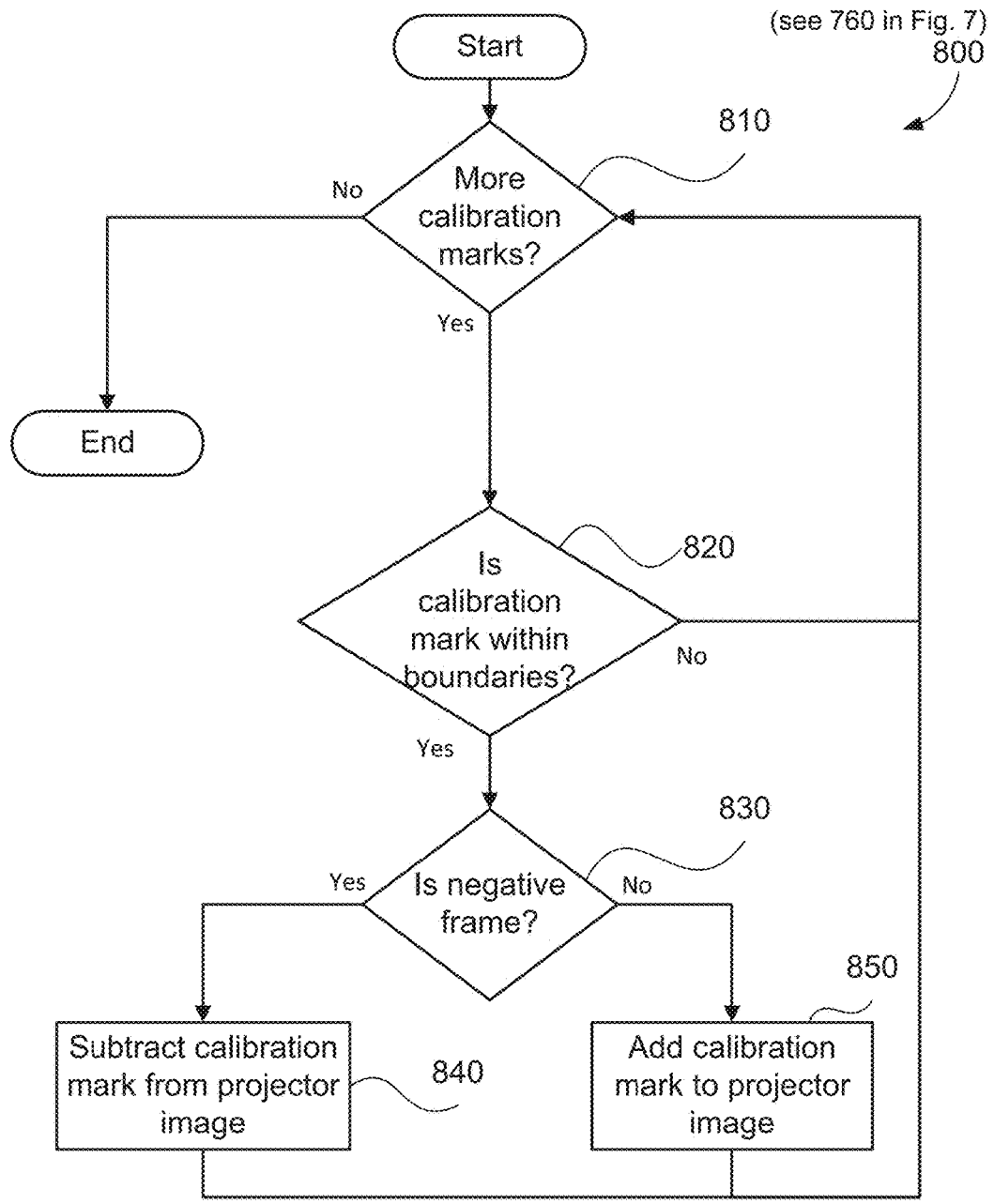
FIG. 8 is a schematic flow diagram illustrating a method of rendering a calibration pattern to a projector image as used in the method of FIG. 7.

FIG. 8: Rendering a Calibration Pattern

FIG. 8 is an example of a flow chart of a process 800, as executed at the step 760 of the process 700, of rendering a calibration pattern to a projector image, as executed by the renderer 606. The process 800 is executed for a current projector image of a projector that is currently performing calibration. The process 800 starts and proceeds to a decision step 810, where it is determined if there are more calibration marks in the calibration pattern remaining to be rendered. As described previously with reference to FIG. 3A, a calibration pattern typically consists of several calibration marks. For example, the calibration pattern 301, described previously with reference to FIG. 3A, consists of dot-shaped calibration marks, such as the calibration mark 310.

If it is determined at the step 810 that there are more calibration marks remaining to be rendered, the process 800 proceeds to a decision step 820, where it is determined if the next calibration mark is within the boundaries of regions of the projector image, as defined by the alignment data 605. It is preferable that calibration marks are only rendered if they are within the boundaries of the regions of the projector image, and can therefore more easily be made imperceptible. For example, with reference to FIG. 3 the calibration mark 310 is outside the boundaries of the regions 241 and 242 of the projector image 321, and is therefore not rendered. If it is determined that the calibration mark is not within the boundaries of the portion of the content image in the current projector image, the process 800 returns to the decision step 810.

If it is determined at the step 820 that the next calibration mark is within the boundaries of the regions of the projector image, the process 800 proceeds to a decision step 830, where it is determined if the current projector image is a negative frame. As described earlier, a negative frame is projected, followed by a positive frame, or vice-versa.

If it is determined at the step 830 that the frame being rendered is a negative frame, processing proceeds to a calibration mark subtraction step 840, where the calibration mark is subtracted from the projector image. An example of subtracting a calibration mark from a projector image was described previously with reference to FIG. 4. Upon completion of the subtraction step 840, the process 800 returns to the step 810.

If it is determined at the step 830 that the frame being rendered is not a negative frame (i.e. it is a positive frame), processing proceeds to a calibration mark addition step 850, where the calibration mark is added to the projector image. An example of adding a calibration mark to a projector image was described previously with reference to FIG. 4. Upon completion of the addition step 850, the process 800 returns to the step 810.

If at the decision step 810 it is determined that there are no calibration marks remaining, the process 800 ends. At this stage, the calibration pattern has been rendered to a projector image, for a projector that is currently performing calibration.

FIG. 9: Coarse and Fine Alignment Overview

FIG. 9 is an example of a flow chart for a process 900 depicting an overview of the projection alignment process performed by the projector aligner 604. The projector alignment process in FIG. 9 has many steps. A first coarse alignment step 910 performs "coarse alignment". The remaining steps 920 perform "fine alignment", also known as "alignment refinement".

The detail of the coarse alignment step 910 is described in FIG. 14. The output of the coarse alignment step 910 is the alignment data 605, which can then be used for rendering, and by the rest of the system.

It is possible to align the projection system by performing the coarse alignment step 910 only. However, because of noise from the camera, or from the projector, or because of the discrepancy between the projection surface and the 3D model of the surface, the result of the coarse alignment step 910 is only an approximate alignment of projected portions of the content image. In particular, an occasional misalignment is typical in the blend region.

The fine alignment steps 920 provided by the ARPS arrangements improve alignment accuracy by refining the result of the coarse calibration step 910. The disclosed ARPS arrangements perform alignment refinement steps 920 without the projection of additional calibration data. In fact, the alignment refinement steps 920 may achieve precise alignment using only the results of the coarse alignment step 910 and calibration data generated for the coarse alignment step 910. It is important in adaptive calibration arrangements that calibration and subsequent updates be performed as fast as possible so as to realise a multi-projection system that is responsive to change. Projecting any additional calibration data would introduce additional latency adversely affecting system responsiveness.

FIG. 14: Coarse Alignment

FIG. 14 shows an example of a flow chart for a process 1400 for performing the coarse alignment step 910.

The coarse alignment process 1400 starts at a project/capture/decode step 1402 for the reference projector. Referring to FIG. 1 the left-hand projector 11 1 and the left-hand camera 121 may together be called the "reference device" of the multi-projector system 100. Alternately, the left-hand projector 111 may be called the "reference projector" and the left-hand camera 121 may be called the "reference camera". In the present specification, it is a convention in the system 100 that the reference projector always resides at world coordinate position (0, 0, 0), facing the positive Z axis direction of (0, 0, 1) thus defining the pose of the reference projector. The pose of other components (including cameras and projectors) in the system are defined relative to this reference projector. The term "second" device refers to a particular additional device that is not the reference device, for example, the right-hand device consisting of the right-hand projector 112 and the right-hand camera 122. Similarly, the right-hand projector 112 may be called the "second projector" and the right-hand camera 122 may be called the "second camera".

At the step 1402, the reference projector projects a 2D ruler pattern, and images of the pattern are captured by both the reference and the second cameras. Captured images of the pattern are decoded, thus forming two sets of point correspondences. The process 1200 of obtaining a set of point correspondences between a camera image and a projector image has been described with reference to FIG. 12A. At the step 1402, two sets of point correspondences are determined. The first set of point correspondences (cx1, cy1, px1, py1) is a mapping between the reference camera image and the reference projector image coordinates. The $2^{nd}$ set of point correspondences (cx2, cy2, px1, py1) is a mapping between the second camera image and the reference projector image coordinates. In one ARPS arrangement, the two sets of point correspondences are obtained from the same projected 2D ruler pattern projected by the reference projector, whereby both reference and second cameras simultaneously capture the same projected 2D ruler pattern.

Processing continues at a project/capture/decode step 1404 for the second projector. At the step 1404, the second projector projects a 2D ruler pattern, images of the pattern are captured by the second camera, and the captured pattern is decoded, thus forming a set of point correspondences. The process 1200 of obtaining a set of point correspondences between a camera image and a projector image has been described with reference to FIG. 12A. At the step 1404, a set of point correspondences (cx2, cy2, px2, py2) mapping between second camera image and second projector image coordinates is determined.

In one ARPS arrangement, the steps 1402 and 1404 may be performed concurrently. This involves the 2D ruler dot patterns of the reference projector and second projector being projected simultaneously. In this case, only 1 image need be captured by each camera of the system 100. This requires the two 2D ruler dot patterns to be distinguishable. Distinguishable 2D ruler dot patterns may be created by ensuring (a) that the tiles of each 2D ruler pattern are unique, and (b) the density of dots within each tile is low.

After the step 1404, processing continues at a 3D model determination step 1406. At the step 1406, a 3D model of the surface is determined for both the reference and the second devices. The process 1250 of determining a 3D model of the projection surface has been described with reference to FIG. 12B. Point correspondences (cx1, cy1, px1, py1) are used to determine a 3D model of the surface 160 for the reference device, relative to the reference projector. Point correspondences (cx2, cy2, px2, py2) are used to determine a 3D model of the surface 160 for the second device, relative to the second projector. It should be noted that the two models of the surface may differ somewhat since each projector has a unique projection region on the surface 160 and each camera has a unique view of the surface 160.

Processing continues at a pose determination step 1411. At the step 1411, the position and the orientation (collectively referred to as the pose) of each projector is determined. Following the convention described earlier, the reference projector is always located at (0, 0, 0) and is considered to be un-rotated with respect to the world coordinate system. Hence, the reference projector is assigned a pose consisting of translation vector (0, 0, 0) and a rotation matrix equal to the identity matrix. At the step 1411 the process 1300 of FIG. 13 is used to determine the pose of remaining projectors other than the reference projector, and is described hereinafter in more detail with reference to FIG. 13.

Following the step 1411, processing continues at a combined 3D surface determination step 1412. The step 1412 determines a combined 3D model of the surface 160. A combined 3D model of the surface is determined from individual models of the surface determined at the step 1406 and using pose information determined at the step 1411. It should be noted that the individual models of the surface may differ somewhat since each projector has a unique projection region on the surface 160 and each camera has a unique view of the surface 160. Additionally, there can be error in each of the individual 3D models due to camera sensor noise etc. To address these problems, the two individual models of the projection surface 160 obtained at the step 1406 may be combined to form one combined 3D model of the projection surface 160. Let $\{X_1, Y_1, Z_1\}$ represent the set of 3D points obtained during the step 1406 from point correspondences (cx1, cy1, px1, py1) obtained using the reference device. Let $\{X_2, Y_2, Z_2\}$ represent the set of 3D points obtained during the step 1406 from point correspondences (cx1, cy1, px1, py1) obtained using the second device. Let $R2_p$ and $T2_p$ be the rotation matrix and translation vector of the second projector relative to the reference projector obtained at the step 1411. A combined point cloud $\{X, Y, Z\}$ may be defined as a set of 3D points as follows:

$$\{X,Y,Z\}=\{X_1,Y_1,Z_1\}\cup\{R2_p^{-1}(X_2,Y_2,Z_2)-R2^{-1}T2_p\}$$

where:
- $\{X, Y, Z\}$ are a set of 3D points of a combined point cloud, expressed in coordinates relative to the reference projector
- $\{X_1, Y_1, Z_1\}$ represent the set of 3D points obtained during the step 1406 from point correspondences (cx1, cy1, px1, py1) obtained using the reference device, expressed in coordinates relative to the reference projector
- $\{X_2, Y_2, Z_2\}$ represent the set of 3D points obtained during the step 1406 from point correspondences (cx1, cy1, px1, py1) obtained using the second device, expressed in coordinates relative to the second projector
- $R2_p$ defines the rotation of the second projector relative to the reference projector
- $T2_p$ defines the translation of the second projector relative to the reference projector
- $\cup$ is the union operator that determines a union of the sets of point of its left and right sides.

A combined 3D surface model is obtained by fitting a 3D model to the combined point cloud $\{X, Y, Z\}$ as is performed at the step 1280. At a following combined 3D surface determination step 1412, after determining a combined 3D surface model, processing continues at a virtual view determination step 1413.

A content image, for example the image 200, must be projected onto the projection surface 160 by the multi-projector system 100, in such a way that the resulting projected image is visually pleasing. One technique for achieving this is to determine a likely viewing position for 1 or more viewers (called a "virtual view"), and render the content image according to this virtual view. The step 1413 determines a virtual view of the projection surface, described hereinafter in more detail with reference to FIG. 15.

Figure 15:
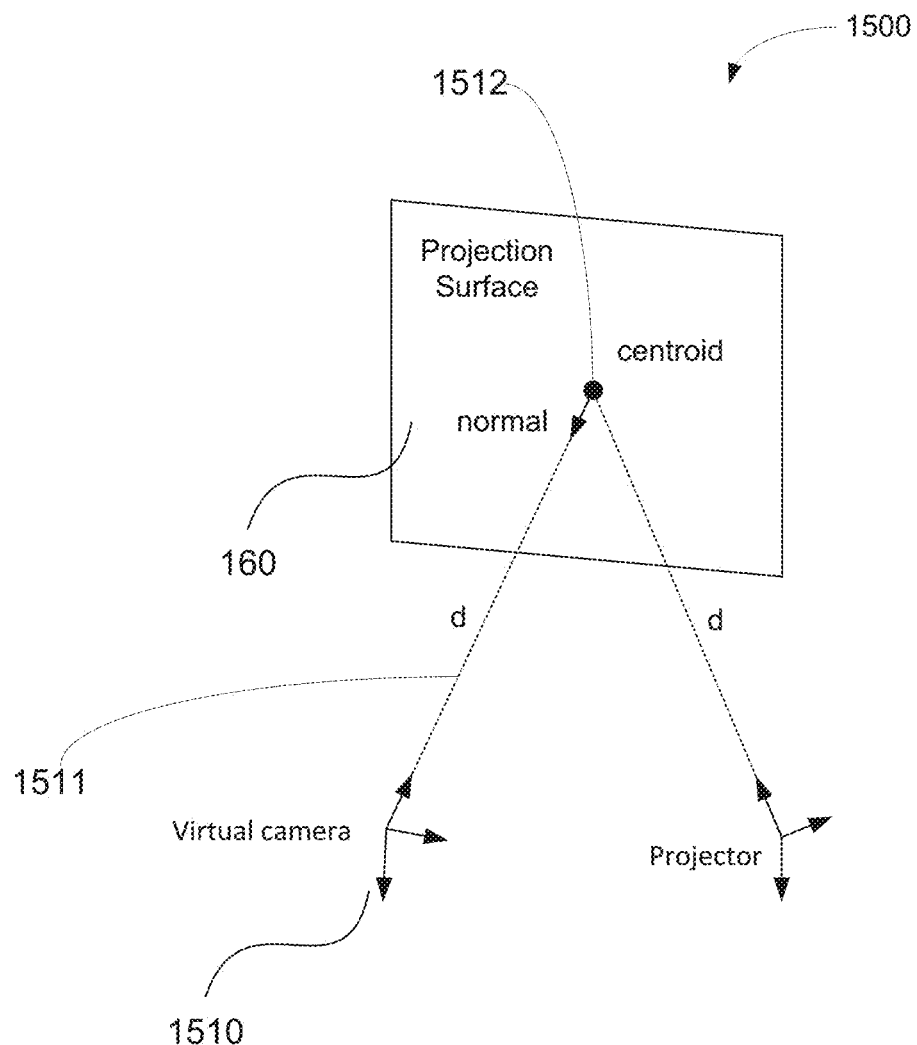
FIG. 15 illustrates the position and orientation of a virtual camera.

FIG. 15 provides an illustration 1500 depicting a virtual view of the projection surface. A virtual camera 1510 represents a virtual view of the projection surface 160. Determining a virtual view involves defining a pinhole model for the virtual camera, comprising its intrinsic and extrinsic parameters. The extrinsic parameters to be defined include the position and rotation of the virtual camera. The position of the virtual camera 1510 is determined as the point that is the same distance, d, from the projection surface 160 as the reference projector, along a vector 1511 from a centroid position 1512 on the surface in a direction normal to the surface. The centroid position on the surface may be determined as the centroid of the point cloud to which the surface model was fitted. The rotation of the virtual camera's coordinate system is such that the projected content image will appear upright and rectangular from the virtual camera pose. The virtual camera is assigned the intrinsic parameters of the camera of the reference device. The virtual camera is a conceptual model used to define a virtual view allowing rendering of a content image to be performed in a way that is pleasing when viewed from the position and orientation of the virtual camera. The virtual camera is not a physical component of multi-projector system 100. Unlike a real camera, virtual camera pixel coordinates are not bounded by the size of a physical camera image sensor. For example, pixel coordinates in the image plane of virtual camera 1510 may be of very large positive or negative magnitude.

Returning to FIG. 14, at the step 1413, after determining a virtual camera pinhole model, processing continues at a projection boundary determination step 1414. The step 1414 determines the projection boundaries of each projector in the virtual view, described hereinafter in more detail with reference to FIGS. 16A and 16B.

Figure 16A:
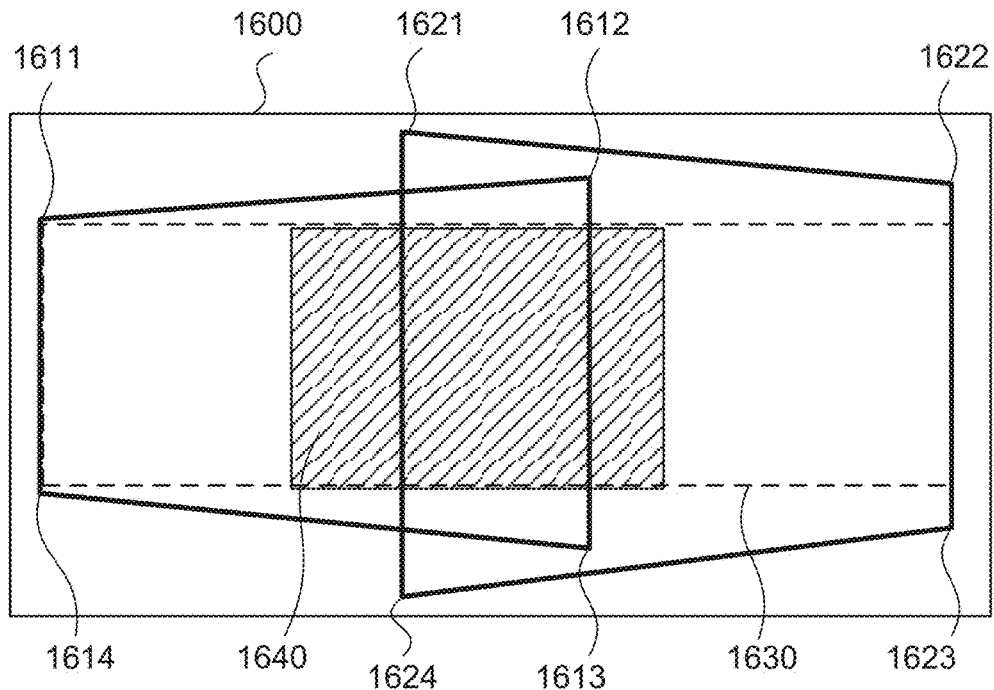
FIG. 16A illustrates the maximal rectangle in the virtual view.

Referring to FIG. 16A, a reference numeral 1600 represents a region of the virtual camera image as observed by the virtual camera 1510. The coordinates of the four corners of a projector image may be expressed as (0, 0), (W−1, 0), (W−1, H−1), (0, H−1), where (W, H) is the resolution in projector pixels of the projector image. Since a pinhole model (comprising intrinsic and extrinsic parameters) of each projector is known, and the 3D model of the projection surface is known, the 3D coordinates (X, Y, Z) on the surface 160 corresponding to projector image corners may be determined using a process known as ray-casting. Ray-casting involves using the pinhole model to determine a ray in 3D space that corresponds to a particular image pixel position. A point where the ray intersects the surface model is then determined. Ray-casting is performed for each corner of each projector image.

The four 3D coordinates corresponding to the four corners on the projection surface may then be projected into the virtual view 1600 using the pinhole model of the virtual camera 1510. This process is repeated for the four corners of both the reference projector and the second projector.

In FIG. 16A, reference numerals 1611, 1612, 1613, and 1614 denote the four corners of the reference projector image in the virtual view 1600. These points define the projection boundary of the reference projector in the virtual view. Similarly, reference numerals 1621, 1622, 1623, and 1624 denote the projection boundary of the second projector in the virtual view 1600.

Returning to FIG. 14, at the step 1414, after determining projection boundaries in the virtual view, processing continues at a maximal rectangle determination step 1415. The step 1415 determines a maximal rectangle. The maximal rectangle is a large rectangle that fits inside the union of all projection regions. This rectangle is where the content image, for example the content image 200, shall be projected, and hence the rectangle should have the same aspect ratio as the content image.

Referring to FIG. 16A, the system first determines a bounding rectangle 1630, within the combined projection area associated with the two projectors 111, 112 in FIG. 1. The top edge of the bounding rectangle corresponds to the bottom-most point of the points of 1611, 1612, 1621, and 1622. The bottom edge of the bounding rectangle corresponds to the upper-most point of the points 1613, 1614, 1623, and 1624. The left edge of the bounding rectangle corresponds to the right-most point of points 1611 and 1614. The right edge of the bounding rectangle corresponds to the left-most point of points 1622 and 1623.

After finding this bounding rectangle 1630, we place the maximal rectangle 1640 in the centre of the bounding rectangle. The width and height of the maximal rectangle is restricted by the width and height of the bounding rectangle and the aspect ratio of the content image. Mathematically speaking, the described method of the step 1415 to obtain the maximal rectangle is not always the solution of maximal area. Other techniques exist to find suitable maximal rectangles and the present ARPS arrangement works equally with such other techniques. Nonetheless, the described technique for determining a maximal rectangle at the step 1415 is simple, computationally fast, and can achieve a good result in practice. After determining a maximal rectangle, processing continues at a projector control point step 1416.

Figure 16B:
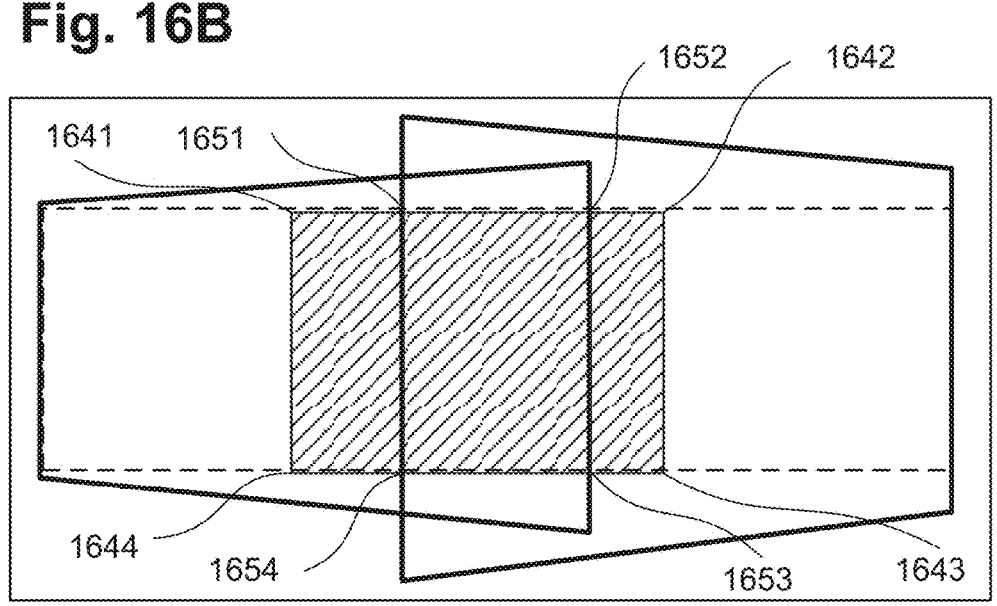
FIG. 16B illustrates the dissection of regions in the virtual view.

The step 1416 defines 6 control points for each projector. Referring to FIG. 16B, four corner points 1641, 1642, 1643, and 1644 of a maximal rectangle are shown. A line segment 1651, 1654 is the intersection of the left edge of the second projector and the maximal rectangle, meaning that the region to the left of this line cannot be projected by the second projector. Similarly, a line segment 1652, 1653 is the intersection of the right edge of the reference projector and the maximal rectangle, meaning that the region to the right of this line cannot be projected by the reference projector.

The eight points 1641-1644 and 1651-1654 in FIG. 16B are each assigned a coordinate (vx, vy) in the virtual view, and also a coordinate in the content image, (ux, uy). Using the virtual camera pinhole model, the six coordinates, 1641, 1644, 1651, 1652, 1653, and 1654, in the virtual view that are related to the reference projector, are ray-cast on to the 3D model of the projection surface to obtain six 3D coordinates (i.e. positions) (X, Y, Z) on the surface. Using the reference projector's pinhole model, the six 3D coordinates (X, Y, Z) are then projected on to the reference projector's image plane, thus defining 6 projector image points (px, py).

Figure 18A:
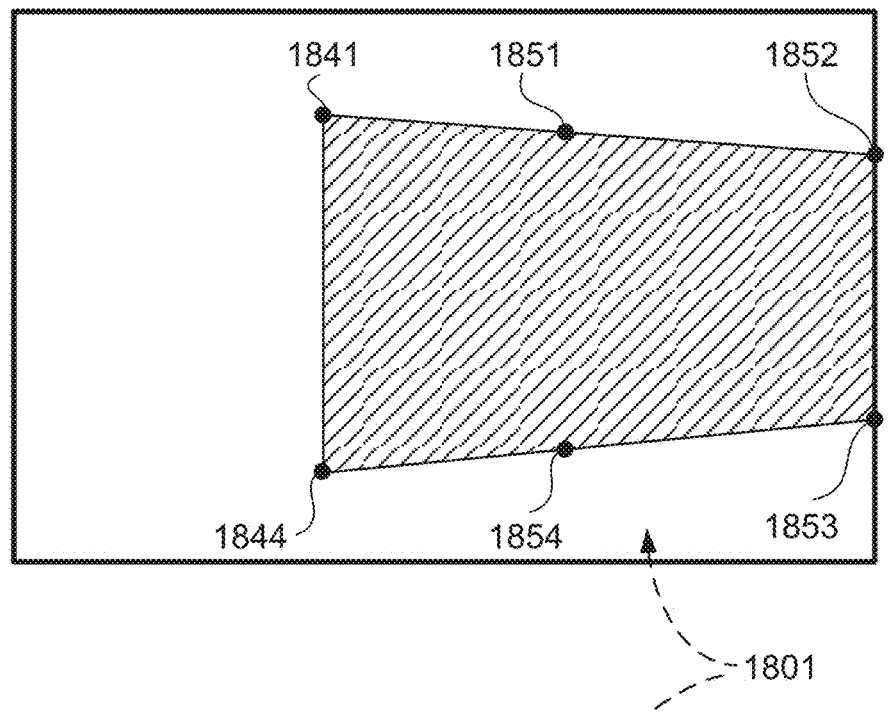
FIG. 18A illustrates the positions of 6 control points in projector coordinates of the reference projector.
Figure 18B:
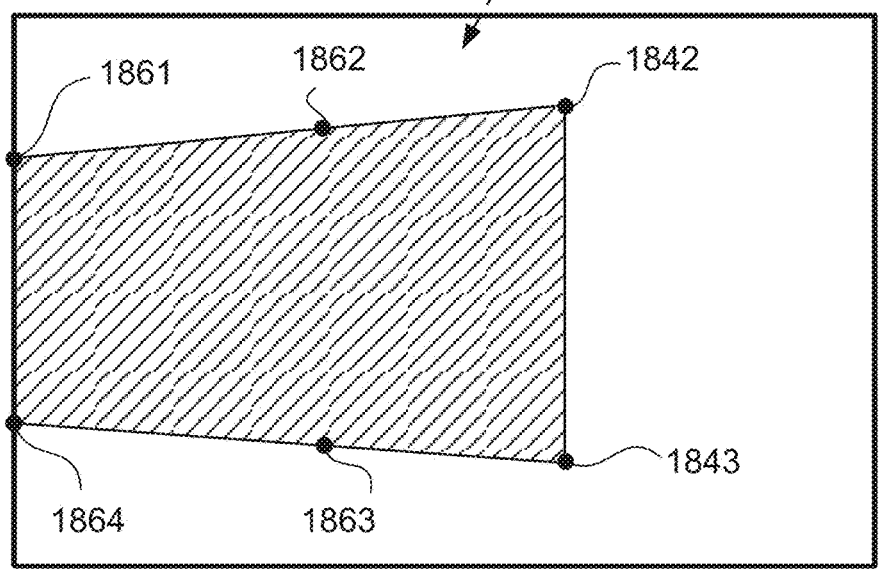
FIG. 18B illustrates the positions of 6 control points in projector coordinates of the second projector.

FIG. 18A illustrates the 6 control points in projector image coordinates of the reference projector. The 6 control points 1841, 1844, 1851, 1852, 1853, and 1854, correspond to the 6 coordinates, 1641, 1644, 1651, 1652, 1653, and 1654, in FIG. 16B. Similarly, FIG. 18B illustrates the 6 control points in projector image coordinates of the second projector. The 6 control points 1842, 1843, 1861, 1862, 1863, 1864, correspond to the 6 coordinates, 1642, 1643, 1651, 1652, 1653, 1654 in FIG. 16B. After defining 6 control points for each projector, processing continues at a content image dissection step 1417. The complete set of control points 1841, 1844, 1851, 1852, 1853, and 1854 plus 1842, 1843, 1861, 1862, 1863, 1864 are referred to collectively using a reference numeral 1801.

The step 1417 dissects the content image 200. For each projector, using the 6 control points (px, py) and corresponding 6 coordinates (ux, uy) in the content image 200, the renderer 606 must warp the content image 200 and render the result to a projector panel image accordingly, thus projecting the warped image. The six control points define two abutting quadrilaterals. To render a warped content image, a homography transform may be determined for each of the two abutting quadrilaterals. Each homography transform may be fitted to the 4 corner points (px, py) of the quadrilateral and to the 4 corresponding content image coordinates (ux, uy). The cvGetPerspectiveTransform( ) function of the OpenCV library may be used to determine such a homography. The fitted homography transforms allow efficient rasterization of the projector panel image to proceed as performed at the step 740 by the renderer 606. Each homography provides a mapping from a sub-region within the projector panel image to a corresponding content image pixel in the content image 200. Bilinear interpolation or some other form of filtering may be used to reduce aliasing effects associated with resampling of the content image 200.

It should be noted that four of the six control points define a quadrilateral corresponding to a blend region. At the step 740, the renderer 606 adjusts the intensity of pixels within this quadrilateral by attenuating pixel intensity based on proximity to the edge of the blend region. For example, the distance to the edge of the blend region may be determined and a lookup table used to determine an attenuation value. The attenuation value may be used to scale pixel values prior to writing them to the projector panel image.

The control points (px, py) and corresponding content image coordinates (ux, uy), along with additional data such as blend region information and homography transforms are collectively referred to as the alignment data 605. Following the step 1417, the process 1400 ends.

FIG. 13: Obtain the Pose (Position and Orientation) of a Second Device

FIG. 13 is a flow chart for an example of a process 1300 to obtain the pose (i.e. the position and orientation) of a second device, relative to a reference device. Processing starts at a reference device model retrieval step 1310 where projector-camera pinhole models of the reference device are retrieved. The process of determining projector-camera pinhole models has been described with reference to FIG. 10 steps 1010-1070. In one ARPS arrangement, projector-camera pinhole models are pre-determined and stored in non-volatile memory of the controller 130 at a step 1070 of FIG. 10. These pinhole models are retrieved from non-volatile memory and stored in RAM of the controller 130. After retrieving pinhole models of the reference device, the following information is known and ready for further use by the controller 130:

The intrinsic matrix of the reference projector, $A_p$

The position and orientation of the reference projector, which by definition comprise a rotation matrix equal to the identify matrix, and a translation vector equal to the zero vector.

The intrinsic matrix of the reference camera, $A_c$ and

The position and orientation of the reference camera (relative to the reference projector), described by a rotation matrix, $R_C$ and a translation vector, $T_c$.

Following the step 1310, processing continues at second device model retrieval step 1320.

The step 1320 retrieves projector-camera pinhole models of the second device. This process has been described with reference to FIG. 10 steps 1010-1070. In one ARPS arrangement, projector-camera pinhole models are pre-determined and stored in non-volatile memory associated with the controller 130 at the step 1070. These pinhole models are retrieved from non-volatile memory and stored in RAM of the controller 130.

After determining pinhole models of the second device, the following information is known and ready for further use by the controller 130:

The intrinsic matrix of the second projector, $A2_p$

A position and orientation of the second projector. At this point the position and orientation of the second projector will be a rotation matrix equal to the identify matrix, and a translation vector equal to the zero vector.

The intrinsic matrix of the second camera, $A2_c$ and

The position and orientation of the second camera (relative to the second projector, not the reference projector), denoted by rotation matrix, $R_{c2p2}$ and the translation vector, $T_{c2p2}$.

Following the step 1320, processing continues at a point correspondence step 1350.

At the step 1350, the system obtains a set of point correspondences between camera image coordinates of the second device, and projector image coordinates of the reference projector. The required set of point correspondences (cx2, cy2, px1, py1) will have been determined at the step 1402 of the process 1400 as shown in FIG. 14. The required set of point correspondences (cx2, cy2, px1, py1) are determined at the step 1402 by projecting a 2D ruler pattern using the reference projector, capturing images of the projected pattern using the second camera and decoding the captured pattern according to the process 1200 as has been described with reference to as shown in FIG. 12A. Following the step 1350, processing continues at a 3D surface coordinate determination step 1360.

At the step 1360, the system determines the 3D coordinates (X, Y, Z) on the surface 160 corresponding to each of the (cx2, cy2, px1, py1) in the set of point correspondences obtained at the step 1350. Because the 3D model of the projection surface has been determined at the step 1406 using point correspondences (cx1, cy1, px1, py1), and the intrinsic matrix of the reference projector is known (as obtained in the step 1310), the system can determine the 3D coordinates (X, Y, Z) by ray-casting projector pixel coordinates (px1, py1) on to the 3D model of the projection surface. Following this, the system forms a list of 3D-2D point correspondences (X, Y, Z, cx2, cy2) mapping between 3D coordinates on the surface 160 and the second camera's image coordinates. Processing then continues to a $2^{nd}$ camera position and orientation determination step 1370.

The step 1370 calls the cvFindExtrinsicCameraParams2( ) function of the OpenCV library. This function takes the 3D points (X, Y, Z), the camera coordinates (cx2, cy2), the intrinsic parameters of the camera, $A2_c$ and determines the rotation matrix, $R2_c$ and the translation vector, $T2_c$. This determines the position and the orientation of the second camera relative to the reference projector. Since the reference projector defines the world coordinate system origin, the determined $R2_c$ and $T2_c$ are the pose of the second camera within the world coordinate system. $R2_c$ and $T2_c$ may be used to transform 3D points (X, Y, Z) from the reference projector coordinate system to 3D points relative to the second camera. Processing then continues to a $2^{nd}$ projector position and orientation determination step 1380.

At the step 1380, the position and orientation of the second projector is determined by the rotation matrix, $R2_p$ and translation vector $T2_p$. Similarly, $R2_p$ and $T2_p$ may be used to transform 3D points (X, Y, Z) from the reference projector coordinate system to 3D points relative to the second projector. $R2_p$ and $T2_p$ are calculated by:

$$\begin{bmatrix} R2_p & T2_p \\ 000 & 1 \end{bmatrix} = \begin{bmatrix} R_{c2p2} & T_{c2p2} \\ 000 & 1 \end{bmatrix}^{-1} \begin{bmatrix} R2_c & T2_c \\ 000 & 1 \end{bmatrix}$$

where:

$R2_p$, $T2_p$ are the respective rotation and translation of the second projector relative to the reference projector (also referred to as the pose of the second projector relative to the reference projector)

$R_{c2p2}$, $T_{c2p2}$ define the respective rotation and translation of the second camera relative to the second projector $R2_c$, $T2_c$ define the respective rotation and translation of the second camera relative to the reference projector.

Upon completion of step 1380, process 1300 ends.

FIG. 9: Fine Alignment

Having described the coarse alignment step 910 in FIG. 9, we now turn to the fine alignment steps 920, and in particular referring to FIG. 9, following the coarse alignment step 910, processing continues to a coarse alignment ruler image retrieval step 921.

At the step 921 two warped images 520 of projected 2D ruler patterns are retrieved from storage 602 of the controller 130. These images will have been used previously during the process 1400 as performed during the coarse alignment step 910. Specifically, the previously determined warped image formed using the reference projector and the second camera is retrieved (let the image be denoted $I_1$). Additionally, the previously determined warped image formed using the second projector and the second camera is retrieved (let the image be denoted $I_2$). After the step 921, processing continues to an overlap region location decoding step 922.

The steps 922-925 of the process 900 in FIG. 9 are now described in more detail with reference to FIG. 17.

Figure 17:
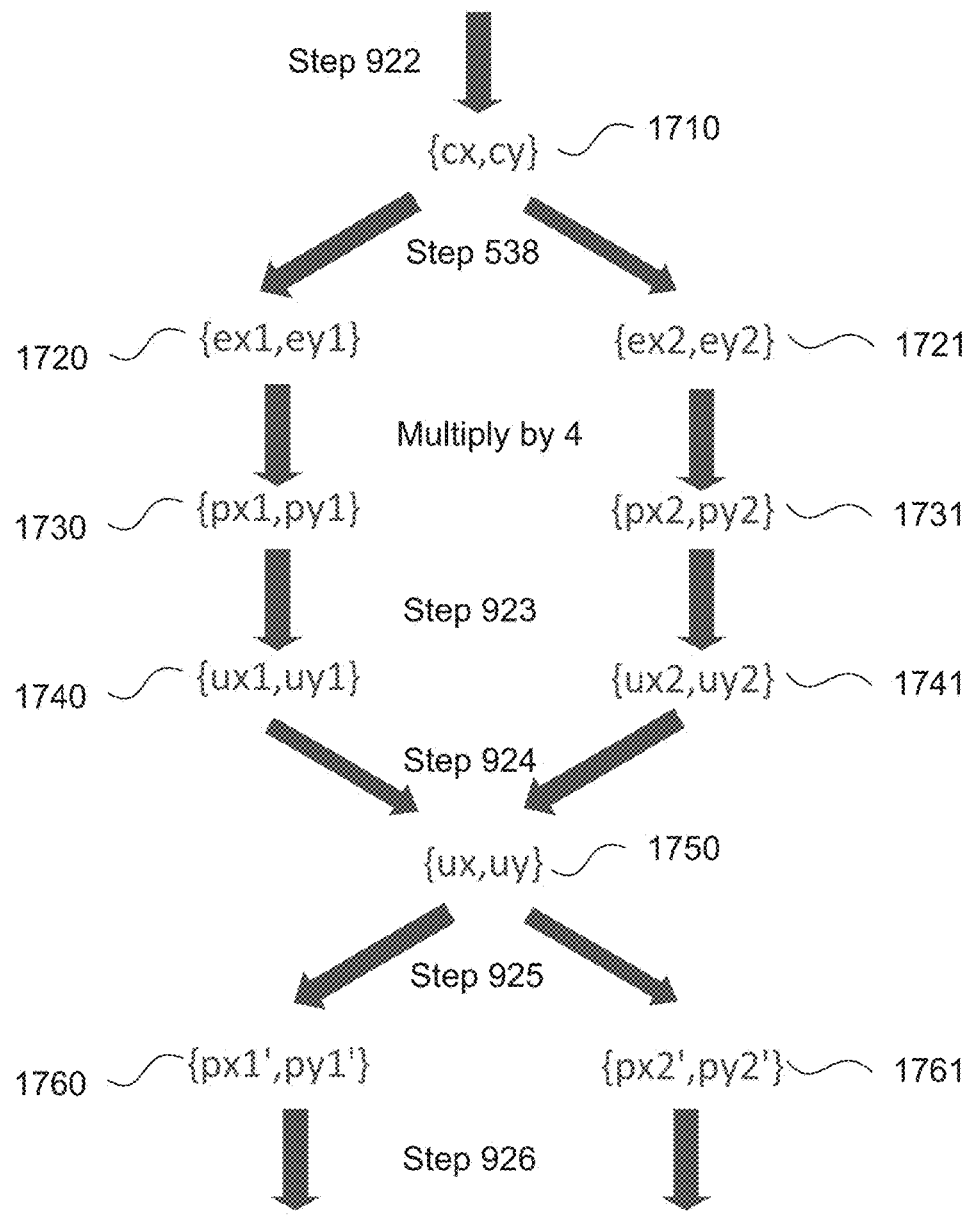
FIG. 17 illustrates the calculation of coordinates at steps 922, 923, 924, 925 of FIG. 9.

FIG. 17 is a data flow diagram illustrating the conversion of coordinates in the steps 922-925 in FIG. 9. FIG. 17 illustrates how one camera image coordinate 1710, matches one content image coordinate 1740 and 1741 for each projector, respectively, and how a single content image coordinate 1750 is subsequently chosen to correspond to the camera image coordinate 1710.

At the overlap region location decoding step 922, the controller 130 decodes more locations within the overlap region of the warped images $I_1$ and $I_2$. $I_1$ and $I_2$ are determined from images captured from the second camera.

To determine the overlap region within the images $I_1$ and $I_2$, intermediate results from the process 1400 of FIG. 14 are reused. Specifically, at the control point definition step 1416, the overlap region corners 1651-1654, were ray-cast on to the 3D model of the projection surface determining 3D coordinates (X, Y, Z) on the surface. The 3D coordinates (X, Y, Z) corresponding to the overlap region may be projected into the second camera image using the pinhole camera model of the second camera, including its pose determined during the coarse alignment step 1411. The result defines the 4 corners of a quadrilateral corresponding to the projection overlap region within the second camera's image.

A set of sampling points {cx, cy} (i.e. 1710) within the projection overlap region of the second camera's image are then defined. A sampling grid may be used to determine the positions of sampling points, where sampling points exist where horizontal and vertical sampling grid lines intersect. The size of sampling grid cells (i.e. distance between sampling grid lines) may be chosen to provide a higher density of sampling in comparison to that used during the coarse alignment step 910. Determined sampling points {cx, cy} are limited to those points inside the quadrilateral corresponding to the projection overlap region. The determined sampling points {cx, cy} are transformed to a set of points {wx, wy} inside warped images $I_1$ and $I_2$ using the warp transform 515.

Alternatively, a sampling grid may be defined directly within the overlap region within each of the warped images $I_1$ and $I_2$, thus defining a set of sampling points {wx, wy}. A corresponding set of points {cx, cy} in the second camera's image can be determined from the sampling points {wx, wy} via an inverse of the warp transform 515.

For each point (wx, wy), the controller 130 decodes the warped images $I_1$ and $I_2$ at (wx, wy) corresponding to (cx, cy) (i.e. 1710) in the second camera's image. Decoding of a 2D ruler pattern has been described with reference to FIG. 5B. Decoding the image $I_1$ determines 2D ruler pattern coordinates (ex1, ey1) (i.e. 1720) which are converted to reference projector image coordinates (px1, py1) (i.e. 1730) as previously described with reference to FIG. 5B. For example, conversion to projector pixel coordinates may simply involve multiplying by 4 as is indicated in FIG. 17. Decoding the image $I_2$ determines 2D ruler pattern coordinates (ex2, ey2) (i.e. 1721) which are converted to second projector image coordinates (px2, py2) (i.e. 1731) as previously described with reference to FIG. 5B. Hence, sets of corresponding points {px1, py1}, {px2, py2} are formed where each (px1, py1) and (px2, py2) corresponds to a common point (cx, cy) in the second camera's image. After the step 922, processing continues to a projector coordinate content position determination step 923.

The step 923 maps the point sets {px1, py1} and {px2, py2} that have been determined at the step 922 into positions within the content image 200 using the alignment data 605 obtained in the coarse alignment step 910. For the reference projector, a homography transform was determined during coarse alignment at the step 1417 to map from the reference projector image to the content image. This homography transform is used to map the point set (px1, py1) to the content position point set {ux1, uy1} (i.e. 1740) within the content image 200. Similarly, for the second projector, a homography transform determined at the step 1417 is used to map the points {px2, py2} to the points {ux2, uy2} (i.e. 1741).

The sets of points in (ux1, uy1) and {ux2, uy2}, are actually derived from the same set of points (cx, cy) in the second camera's image. Under perfect conditions, one would expect {ux1, uy1} and {ux2, uy2} to be identical. However, because of influences such as image noise, and imperfection of the surface model obtained in the coarse alignment step 910, these two sets of content image coordinates may differ. In other words, from the second camera's point of view, two different parts of the content image 200 are being projected to the same location on the projection surface 160. This results in misalignment of the content image 200 which may be visible to viewers. After the step 923, processing continues to a desired content determination step 924.

The step 924 determines desired content positions for the sets {ux1, uy1} and {ux2, uy2}. Let (ux, uy) (i.e. 1750) be a set of average positions of {ux1, uy1} and {ux2, uy2}. That is, for each pair of corresponding points (ux1, uy1) and (ux2, uy2), an average point (ux, uy)=(0.5*ux1+0.5*ux2, 0.5*uy1+0.5*uy2) is determined. Each average point (ux, uy) defines a desired position in which to shift positions (ux1, uy1) and (ux2, uy2) to. Other schemes of determining desired positions may be used. For example, a weighted average of points (ux1, uy1) and (ux2, uy2) could be taken using a weighting scheme based on signal-to-noise ratio associated with each device. Processing then continues to a desired content mapping step 925.

The step 925 maps the desired content positions {ux, uy} back to refined projector image coordinates of each projector. For the reference projector, a homography transform was determined during coarse alignment, at the step 1417, to map from the reference projector image to the content image 200. This homography transform is inverted to define a mapping from the content image 200 back to the reference projector image. Using the inverse homography, the desired content positions {ux, uy} are transformed thus determining a set of adjusted projector image coordinates {px1', py1'} (i.e. 1760). Again, because of noise, or imperfection of the surface model, the set of points {px1', py1'} is not identical to {px1, py1}. The point set {px1', py1'} represents a refinement of the point set {px1, py1}. Similarly, a point set {px2', py2' } (i.e. 1761) of refined points in the second projector's image is determined by transforming {ux, uy} using the inverse of a homography determined at the step 1417. Processing then continues to a warp updating step 926.

The step 926 updates the alignment data 605 for each projector to align to the refined projector point sets {px1', py1'} and {px2', py2'}.

Figure 19:
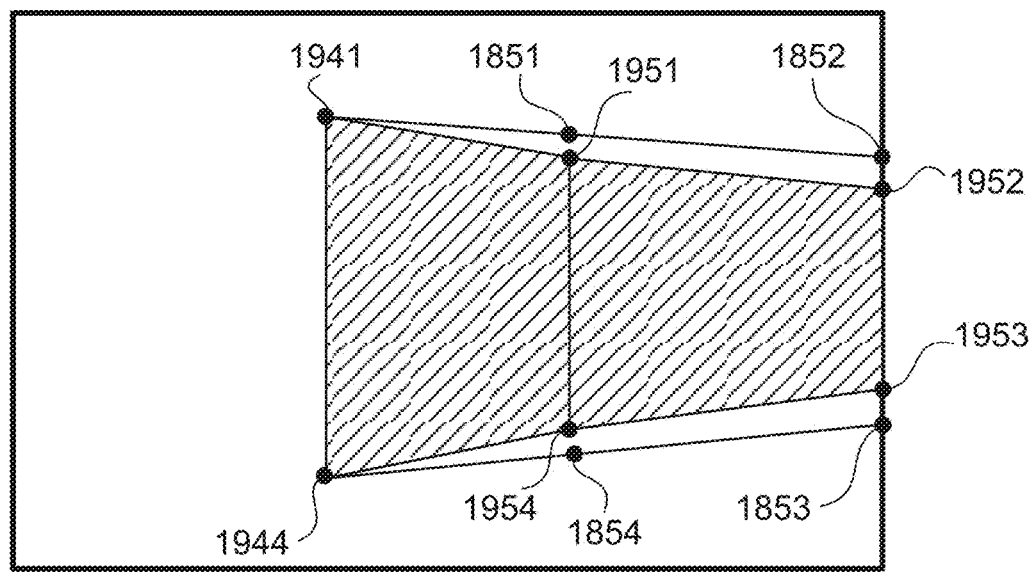
FIG. 19 illustrates the refined 6 control points in projector coordinates of the reference projector.

FIG. 19 illustrates refined control points in the projector image of the reference projector.

At the step 926 the 4 control points defining the blend region, are mapped from the positions 1851, 1852, 1853, and 1854, to refined positions 1951, 1952, 1953, and 1954 respectively. To achieve this, a refinement homography is determined that maps the point set {px1', py1'} to the point set {px1, py1}. The cvFindHomography( ) function of the OpenCV library may be used to determine this refinement homography. The four control points 1851-1854 are then transformed by the determined refinement homography. The same process is applied to the 4 blend region control points of the second projector using a refinement homography that maps point set {px2', py2'} to {px2, py2}.

Using the refined set of 6 control points for each projector, the alignment data 605 is updated, as has been described with reference to the step 1417 of FIG. 14. This allows the renderer 606 to warp the portion of the content image a particular projector is projecting according to the refined alignment data 605, thus updating the corresponding projector panel image. Following this, the process 900 is complete.

In one ARPS arrangement, to ensure a smooth, uniform refinement across the content image portions 221, it is desirable to adjust the non-blend control points 1841 and 1844, in addition to the other 4 control points 1851-1854, by transforming by the determined refinement homography. However, it may be desirable to somewhat suppress or dampen the refinement of the non-blend control points 1841 and 1844 to ensure that non-blend control points maintain a stable position over time. To achieve this, one or more additional pairs of equal points (px1, py1) and (px1', py1') corresponding to the non-blend control points 1841 and 1844 may be added to the point sets {px1, py1} and {px1', py1'} prior to fitting of a refinement homography. Alternatively, the refinement homography may be determined by performing a weighted fit to point sets {px, py1} and {px1', py1'} with more weight assigned to an additional pair of equal points (px1, py1) and (px1', py1') corresponding to the non-blend control points 1841 and 1844. This has the effect of decreased refinement of positions near the non-blend control points 1841 and 1844, as is indicated by refined corners 1941 and 1944 while providing a smooth refinement across the entire projected content portion 221.

In one ARPS arrangement, at the step 926, it is desirable to fit a refinement homography in a surface coordinate space instead of in projector image space. This may be advantageous when the surface is non-planar, and hence the required refinement in projector image space would be non-linear. To achieve this, the point sets {px1, py1} and {px1', py1'} are mapped on to the 3D model of the surface 160. Ray-casting may be used to map projector image point sets {px1, py1} and {px1', py1'} to corresponding 3D point sets {X, Y, Z} and {X', Y', Z'} on the surface. Following this, point sets {X, Y, Z} and {X', Y', Z'} may be transformed to a 2 dimensional surface coordinate system. For example, if the projection surface is a vertically oriented cylinder (i.e. with cylinder axis parallel to the Y axis), then a 3D point (X, Y, Z) on the surface may be transformed to a cylinder surface coordinate ($\theta$, y) where $\theta$ defines the angular position in the X-Z plane and y defines the vertical position in the Y direction. By transforming to cylinder surface coordinates as described, point sets {X, Y, Z} and {X', Y', Z'} are mapped to cylinder surface point sets {$\theta$, y} and {$\theta$', y'}. A refinement homography transform may then be fitted that maps point set {$\theta$', y'} to point set {$\theta$, y}. Projector image control points 1851-1854 and, optionally, 1841 and 1844, may then be mapped to cylinder surface coordinates using the same technique of ray-casting followed by conversion to ($\theta$, y) form. The control points, in ($\theta$, y) form, may then be adjusted by transforming by the determined refinement homography. The adjusted control points, in ($\theta$, y) form, may then be converted back to 3D coordinates (X, Y, Z) and projected on to corresponding projector image using the corresponding projector pinhole model.

In other ARPS arrangements, refinement may utilise transformations other than homography transforms. In fact, a refinement homography is just one example of a broader class of possible refinement transformations. Another type of refinement transform would make use of a floating point map of vectors, known as a warp map. For example, at the step 926, a warp map of floating point vectors could be created to map from point set {px1', py1'} to point set (px1, py1). The warp map would then be used to adjust the position of control points 1851-1854 and, optionally, 1841 and 1844. Another possible refinement transformation would involve a mesh representation, for example a triangular mesh or quadrilateral mesh, as is commonly used in the field of 3D graphics.

In yet further ARPS arrangements, described techniques may be used to accurately align multi-projector systems comprising more than two projectors. In such systems, multiple overlap regions may exist. Each projected portion of the content image contributing to each overlap region may be aligned using the described coarse alignment and alignment refinement steps.

INDUSTRIAL APPLICABILITY

The arrangements described are applicable to the computer and data processing industries and particularly for the image processing and production industries.

The foregoing describes only some embodiments of the present invention, and modifications and/or changes can be made thereto without departing from the scope and spirit of the invention, the embodiments being illustrative and not restrictive.

The invention claimed is:

1. A method of aligning two portions of an image, a first of the portions being projected by a first projector on a surface and a second of the portions being projected by a second projector on the surface to form respective projected portions of the image, wherein a calibration pattern is projected in each or the two portions, the method comprising the steps of: capturing from the surface an image of the calibration pattern from each of first and second projected portions, the calibration pattern extending across a combined projection area of the first and second projectors; locating an overlap area or the first and second projected portions of the image according to the calibration pattern across the combined projection area; the overlap area comprising a predetermined location on the surface; for each of the first and second projectors; determining projector image coordinates at the predetermined location using a position in the calibration pattern of image data captured from the surface at the predetermined location; and aligning the two projected portions of the image according to the determined locations in the overlap area of the first and second projected portions.

2. The method according to claim 1, wherein the determining step further comprises the steps of: determining content positions corresponding to the projector image coordinates; determining a desired content position dependent upon the determined content positions; mapping the desired content position to refined projector image coordinates; and updating alignment data for at least one of the first projector and the second projector to align to the refined projector image coordinates.

3. The method according to claim 2, wherein a homography transform is applied to the projector image coordinates to determine the content positions.

4. The method according to claim 2, wherein the content positions are based on the projector image coordinates determined for the first projector and projector image coordinates determined for the second projector.

5. The method according to claim 2, wherein the step of determining the desired content position comprises determining an average of the determined content positions.

6. The method according to claim 2, wherein the step of determining the desired content position comprises determining a weighted average of the determined content positions.

7. The method according to claim 6, wherein the weighted average is dependent upon a signal-to-noise ratio associated with at least one of the first projector, the second projector and a camera performing the capturing step.

8. The method according to claim 2, wherein the mapping step comprises applying a homography transform to the desired content position to determine the refined projector image coordinates.

9. The method according to claim 2, wherein the mapping step comprises the steps of:

mapping the projector image coordinates onto a 3D model of the surface to form corresponding 3D point sets on the surface; and transforming the 3D point sets to a 2 dimensional surface coordinate system.

10. The method according to claim 9 wherein a 3D point on the surface may be transformed to a cylinder surface coordinate (θ, y) where θ defines the angular position in the X-Z plane and y defines the vertical position in the Y direction.

11. The method according to claim 2, wherein a warp map comprising a floating point map of vectors, is applied to the projector image coordinates to determine the content positions.

12. The method according to claim 2, wherein a mesh representation such as a triangular mesh or quadrilateral mesh is applied to the projector image coordinates to determine the content positions.

13. The method according to claim 2, wherein the mapping step comprises determining the refined projector image coordinates by mapping the desired content positions from a content image space to a projector image space.

14. The method according to claim 1, wherein the aligning step performs alignment further dependent upon control points outside the overlap area of the first and second projected portions.

15. The method according to claim 14, wherein one or more additional pairs of equal projector image coordinates and refined projector image coordinates corresponding to control points outside the overlap area are added to the projector image coordinates points and refined projector image coordinates.

16. The method according to claim 14, comprising performing a weighted fit to projector image coordinates and refined projector image coordinates with more weight assigned to an additional pair of equal points corresponding to control points outside the overlap area.

17. A method of aligning two portions of an image, each of the portions of the image being projected by a first and second projector respectively on a surface, the method comprising:

capturing an image of a calibration pattern from each of the first and second projectors projected on to the surface, the calibration patterns extending across the projection area of the first and second projectors;

locating an overlap area of the first and second projectors according to locations of a plurality of calibration points in the calibration patterns, across the projection area, the overlap area comprising a predetermined location on the surface;

for each of the first and second projectors, determining projector image coordinates at the predetermined location by measuring the captured image at the predetermined location using the calibration patterns; and aligning the two portions of the image according to the determined projector image coordinates for the first and second projectors.

18. A computer implemented apparatus for aligning two portions of an image, a first of the portions being projected by a first projector on a surface and a second of the portions being projected by a second projector on the surface to form respective projected portions of the image, wherein a calibration pattern is embedded in each of the two portions, the apparatus comprising: a processor; and a memory storing a processor executable software program for directing the processor to perform a method comprising the steps of: capturing from an image surface an image of the calibration pattern from each of first and second projected portions, the calibration pattern extending across a combined projection area of the first and second projectors; locating an overlap area of the first and second projected portions of the image according to locations of a plurality of the calibration points across the combined projection area; determining, using the calibration patterns projected on the surface, projector image coordinates dependent upon locations in the overlap area said locations being within in each of the first and second projected portions; and aligning the two portions of the image according to the locations of control points and the determined locations in the overlap area of the first and second projected portions.

19. A computer readable non-transitory storage medium storing a computer executable software program for aligning two portions of an image, a first of the portions being projected by a first projector on a surface and a second of the portions being projected by a second projector on the surface to form respective projected portions of the image, wherein a calibration pattern is embedded in each of the two portions, the program comprising: computer executable code for capturing from an image surface an image of the calibration pattern from each of first and second projected portions, the calibration pattern extending across a combined projection area of the first and second projectors; computer executable code for locating an overlap area of the first and second projected portions of the image according to locations of a plurality of the calibration points across the combined projection area; computer executable code for determining, using the calibration patterns projected on the surface, projector image coordinates dependent upon locations in the overlap area said locations being within in each of the first and second projected portions; and computer executable code for aligning the two portions of the image according to the locations of control points and the determined locations in the overlap area of the first and second projected portions.

20. A method of aligning two portions of an image, each of the portions of the image being projected by a first and second projector respectively on a surface, the method comprising:

determining overlap image data corresponding to image data captured in an overlap area of the first and second projectors projecting a calibration pattern on to the surface, the overlap image data comprising image data projected by the first projector and image data projected by the second projector, wherein the overlap image data overlaps a predetermined location on the surface;

for each of the first and second projectors, determining projector image coordinates at the predetermined location by determining a position in the calibration pattern at the predetermined location using the overlap image data; and aligning the two portions of the image according to the determined projector image coordinates for the first and second projectors.

* * * * *